US006453287B1

(12) United States Patent
Unno et al.

(10) Patent No.: US 6,453,287 B1
(45) Date of Patent: Sep. 17, 2002

(54) APPARATUS AND QUALITY ENHANCEMENT ALGORITHM FOR MIXED EXCITATION LINEAR PREDICTIVE (MELP) AND OTHER SPEECH CODERS

(75) Inventors: Takahiro Unno, Richardson, TX (US); Thomas P. Barnwell, III, Atlanta; Kwan K. Truong, Lilburn, both of GA (US)

(73) Assignee: Georgia-Tech Research Corporation, Atlanta, GA (US)

( * ) Notice: Subject to any disclaimer, the term of this patent is extended or adjusted under 35 U.S.C. 154(b) by 0 days.

(21) Appl. No.: 09/408,195

(22) Filed: Sep. 29, 1999

Related U.S. Application Data

(60) Provisional application No. 60/118,644, filed on Feb. 4, 1999.

(51) Int. Cl.[7] .......................... G01L 19/04; G01L 19/08; G01L 13/08

(52) U.S. Cl. ....................... 704/219; 704/201; 704/261; 704/265

(58) Field of Search ................................ 704/200, 208, 704/209, 230, 261, 223, 226, 219, 264, 265

(56) References Cited

U.S. PATENT DOCUMENTS 3,836,717 A * 9/1974 Gagnon ...................... 704/265
4,618,985 A * 10/1986 Pfeiffer ....................... 704/261
4,771,465 A * 9/1988 Bronson et al. ............ 704/219
5,278,943 A * 1/1994 Gasper et al. ............. 704/200
5,839,102 A * 11/1998 Haagen et al. ............. 704/230
6,233,550 B1 * 5/2001 Gersho et al. ............. 704/208
6,304,842 B1 * 10/2001 Husain et al. ............. 704/219

OTHER PUBLICATIONS

Rothenberg ("A New Inverse–Filtering Technique for Deriving the Glottal Air Flow Waveform During Voicing", Journal of the Acoustical Society of America, Nov. 1972).*

* cited by examiner

*Primary Examiner*—Richemond Dorvil
*Assistant Examiner*—Daniel Nolan
(74) *Attorney, Agent, or Firm*—Thomas, Kayden Horstemeyer & Risley, LLP

(57) ABSTRACT

A system and method for enhancing the speech quality of the mixed excitation linear predictive (MELP) coder and other low bit-rate speech coders. The system and method employ a plosive analysis/synthesis method, which detects the frame containing a plosive signal, applies a simple model to synthesize the plosive signal, and adds the synthesized plosive to the coded speech. The system and method remains compatible with the existing MELP coder bit stream.

17 Claims, 28 Drawing Sheets

PLOSIVE SIGNAL DETECTION
INPUT SPEECH
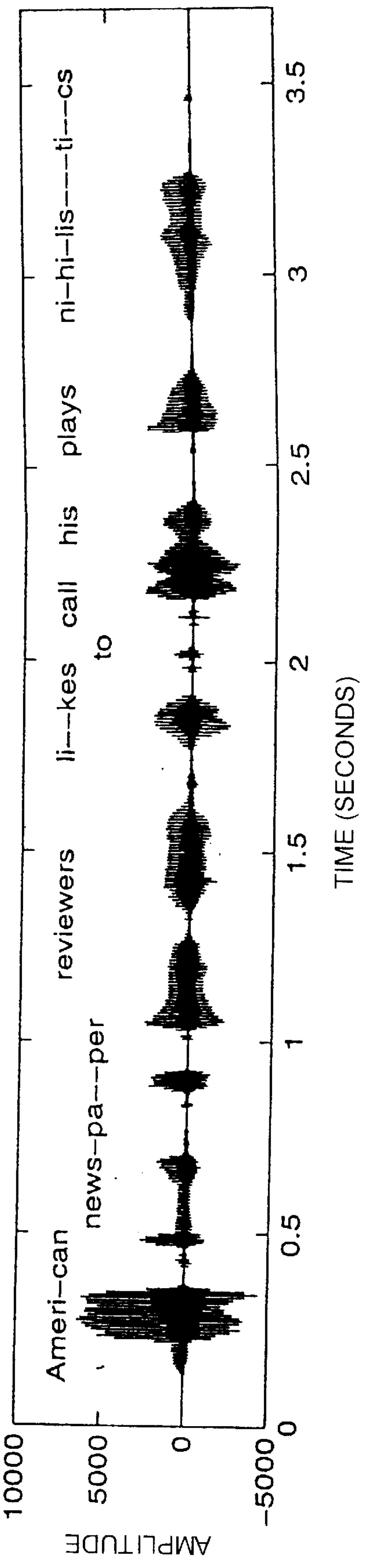
FIG. 3A1

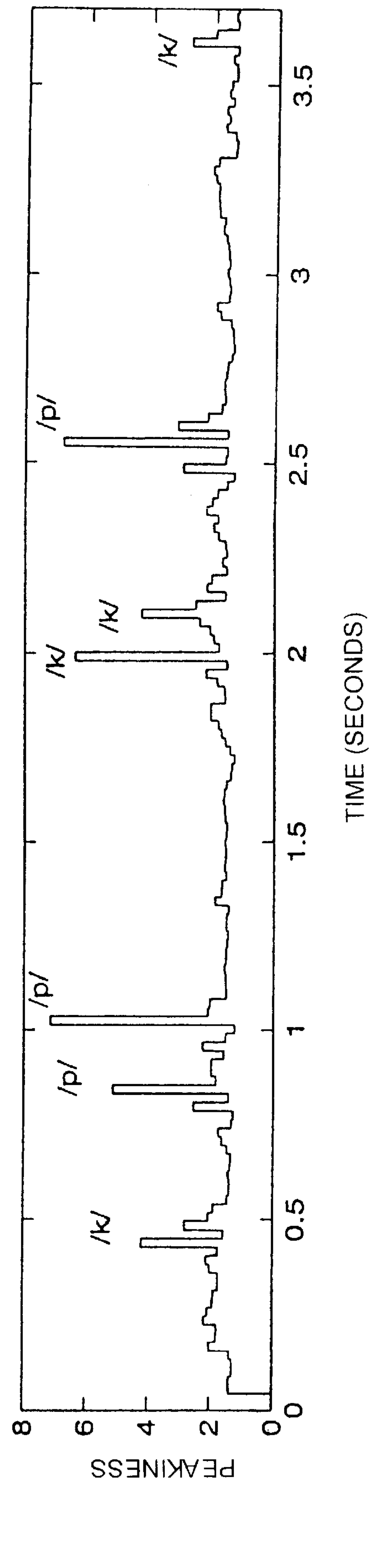
*FIG. 3A2*

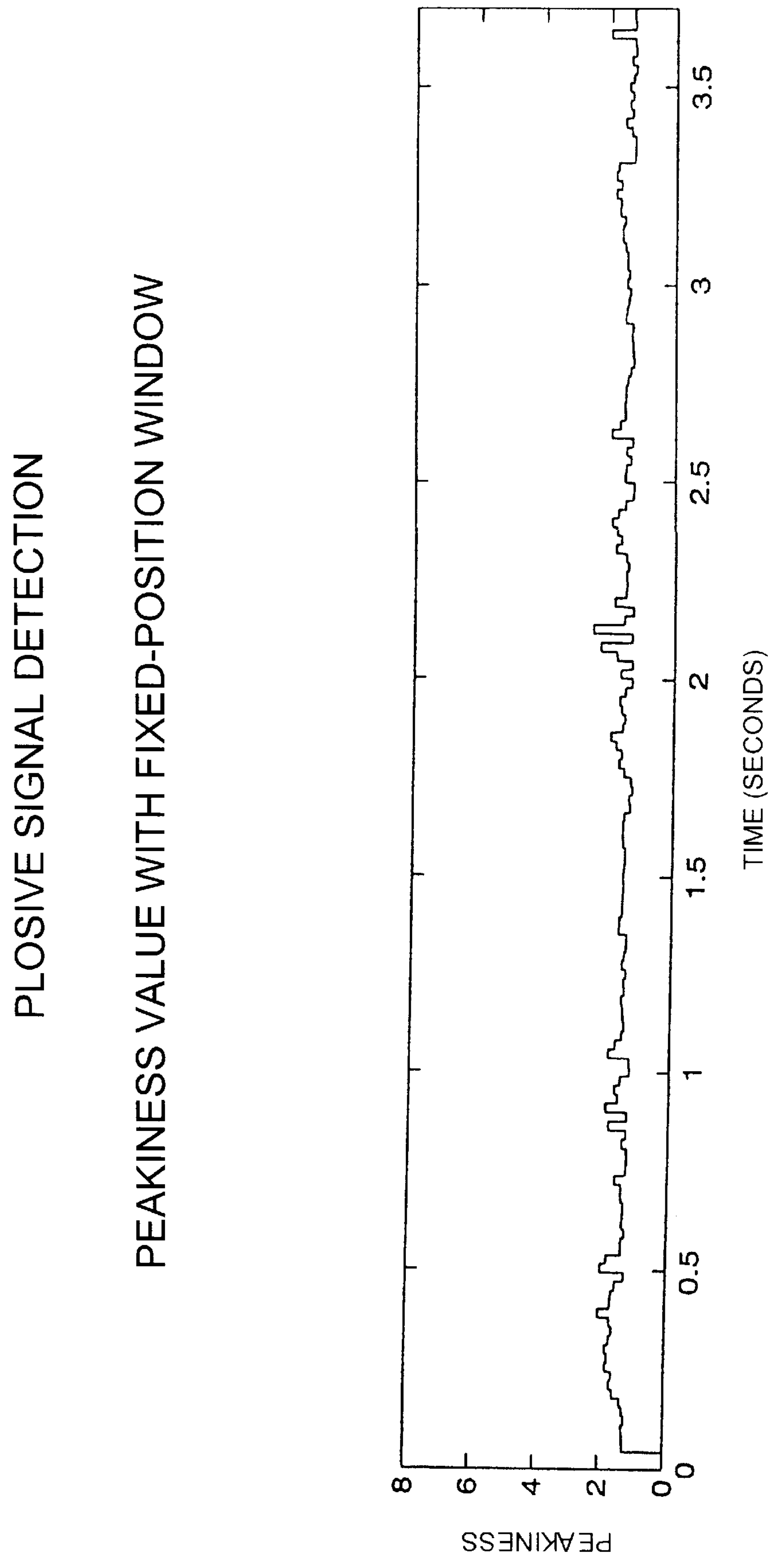
FIG. 3A3

PLOSIVE SIGNAL REPRODUCTION
INPUT SPEECH
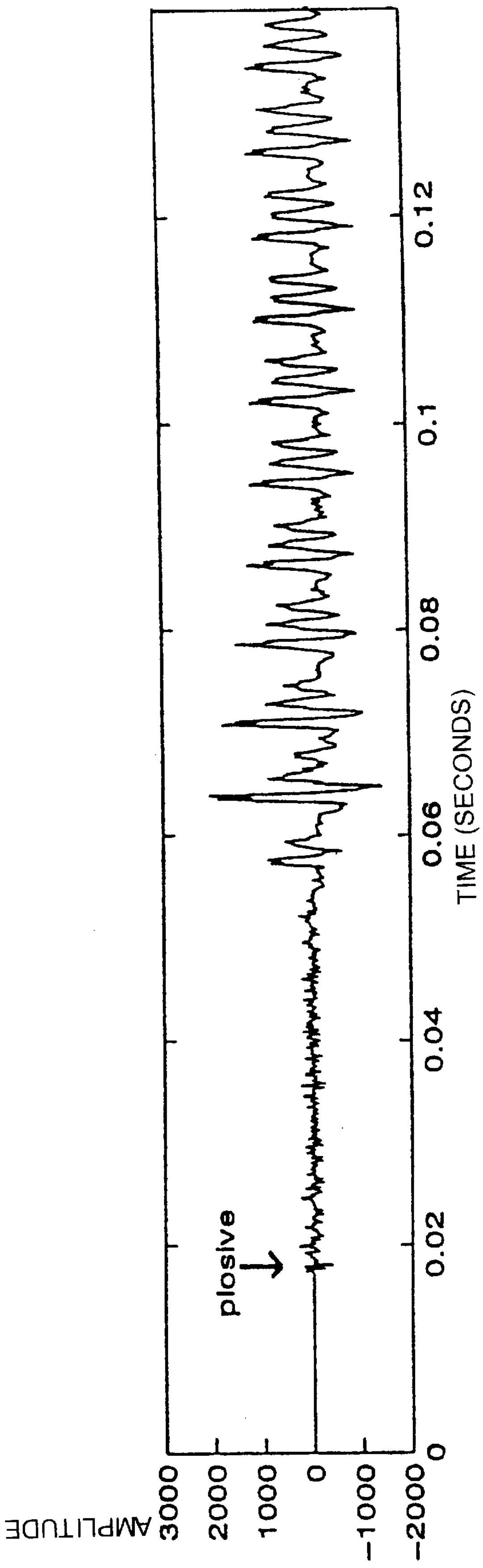
FIG. 3B1

PLOSIVE SIGNAL REPRODUCTION
CODED SPEECH WITH PRIOR ART CODER
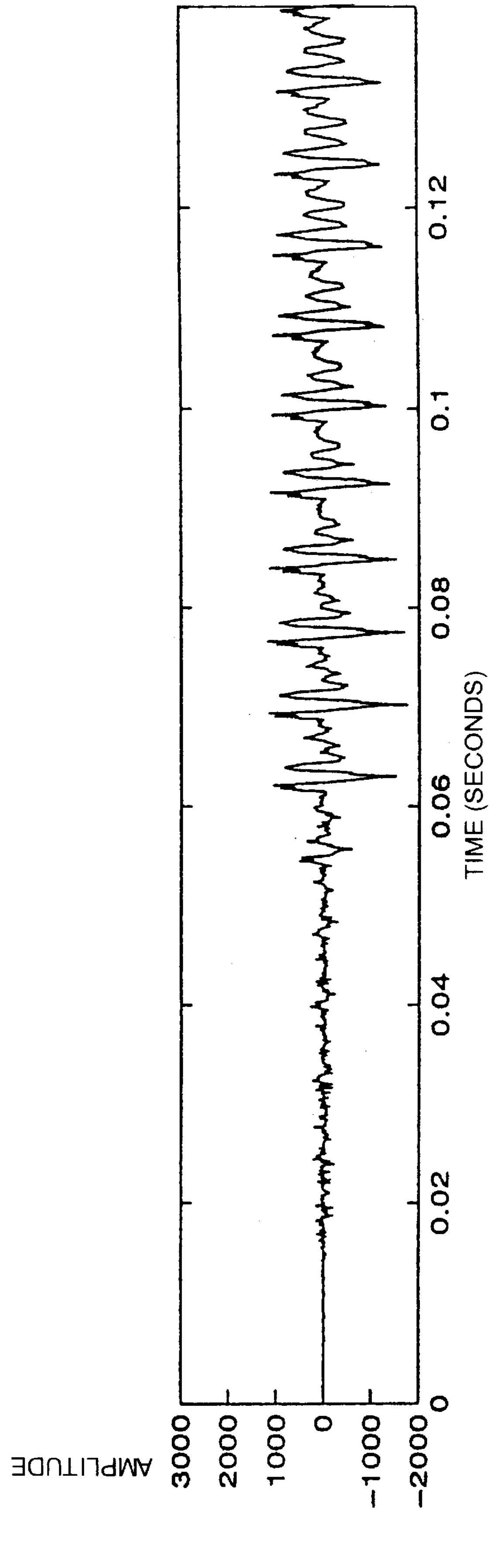
FIG. 3B2

PLOSIVE SIGNAL REPRODUCTION
CODED SPEECH WITH IMPROVED CODER
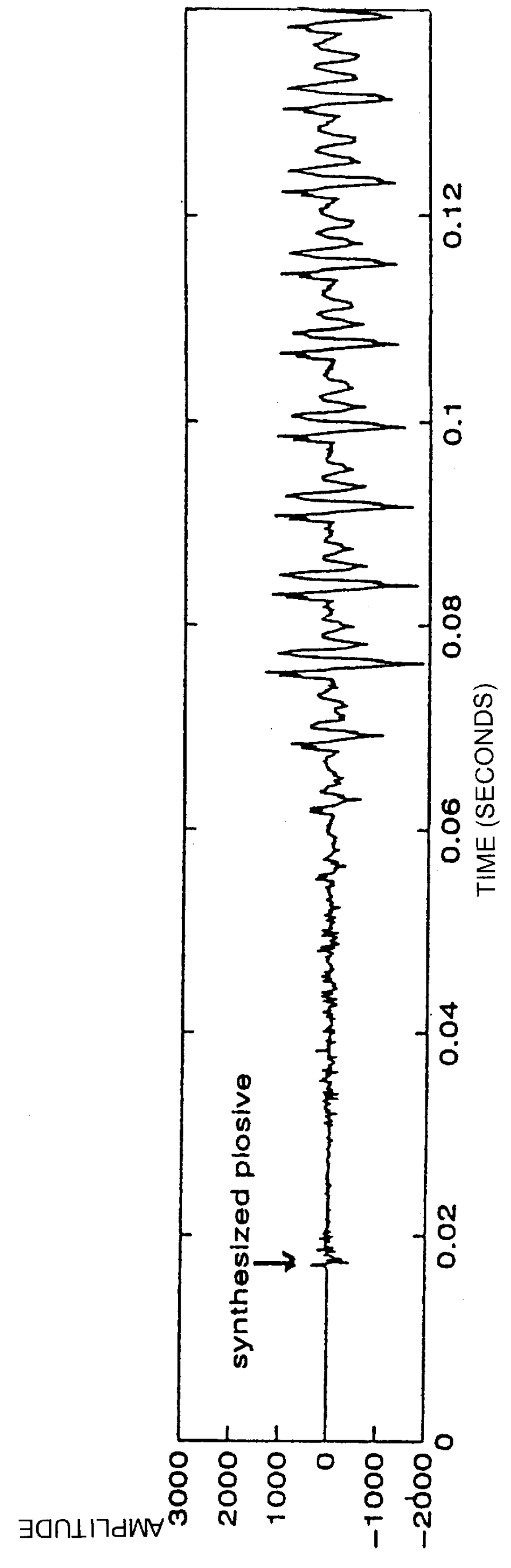
FIG. 3B3

PLOSIVE SIGNAL BIT UNPACKING

REPRESENTATIVE WORDS
CONTAINING PLOSIVE SOUNDS

| NO. | WORD | PLOSIVE TYPE | NO. | WORD | PLOSIVE TYPE |
|---|---|---|---|---|---|
| 1 | **C**ARPET | *k* | 15 | **B**URNED | *b* |
| 2 | A**CC**URACY | *k* | 16 | **B**EVERAGE | *b* |
| 3 | DISLI**K**ES | *k* | 17 | **TH**E | *th* |
| 4 | **P**OPULAR | *p* | 18 | **TH**IS | *th* |
| 5 | **P**LEASE | *p* | 19 | NE**G**OTIATION | *g* |
| 6 | SU**CH** | *tʃ* | 20 | **G**RAIN | *g* |
| 7 | **CH**IEF | *tʃ* | 21 | CARRIA**G**E | *dg* |
| 8 | **T**OMORROW | *t* | 22 | CHAN**G**E | *dg* |
| 9 | **T**AKE | *t* | 23 | **V**ELOCITY | *v* |
| 10 | UNI**T** | *t* | 24 | CONTAIN**S** | *ts* |
| 11 | MATCHE**D** | *t* | 25 | GRAIN**S** | *ts* |
| 12 | **D**IRTY | *d* | 26 | **J**OHN | *j* |
| 13 | **D**ONE | *d* | 27 | _A | *none* |
| 14 | WORL**D** | *d* | 28 | _OVAL | *none* |

NOTE: BOLD CHARACTERS INDICATE THE LOCATION OF THE PLOSIVE.

"_" IN NUMBERS 27 AND 28 REPRESENTS AN ISOLATED ASPIRATION PRECEDING A VOWEL SOUND.

*FIG. 12*

REPLACED PLOSIVE SOUND

| ORIGINAL PLOSIVE SOUND | | 1 *k* | 2 *k* | 3 *p* | 4 *p* | 5 *t* | 6 *t* | 7 *tʃ* | 8 *tʃ* | 9 *d* | 10 *d* | 11 *b* | 12 *b* | 13 *g* | 14 *g* | 15 *th* | 16 *th* | 17 *ts* | 18 *dg* |
|---|---|---|---|---|---|---|---|---|---|---|---|---|---|---|---|---|---|---|---|
| 1 | *k* | x | o | o | 1 | o | x | o | 2 | 2 | o | x | o | 2 | o | o | 2 | o | 1 |
| 2 | *k* | x | o | o | 2 | 2 | 2 | o | x | x | 2 | x | 2 | 2 | o | o | x | 2 | o |
| 3 | *k* | x | o | o | o | 2 | x | o | o | 2 | o | 2 | o | 2 | o | o | x | 2 | 1 |
| 4 | *p* | x | o | o | o | o | 2 | o | o | 2 | o | 2 | o | o | o | o | o | o | o |
| 5 | *p* | o | o | o | 2 | o | x | o | o | 2 | o | 2 | x | o | 1 | o | o | o | 1 |
| 6 | *tʃ* | 2 | o | o | o | o | o | o | o | o | o | 2 | o | o | o | o | 2 | o | o |
| 7 | *tʃ* | o | o | o | o | 1 | o | o | o | o | o | 2 | 1 | o | o | o | o | o | 1 |
| 8 | *t* | o | o | o | o | o | 1 | o | o | o | o | o | 1 | o | o | o | 1 | o | o |
| 9 | *t* | o | o | o | o | o | o | o | o | o | o | o | o | o | o | o | o | 1 | o |
| 10 | *t* | x | o | o | x | x | x | o | x | x | x | o | o | x | o | o | x | 2 | o |
| 11 | *t* | 2 | o | o | 1 | o | o | o | o | o | o | x | 1 | o | 1 | o | 2 | o | o |
| 12 | *d* | 2 | 2 | 2 | 2 | o | x | o | o | o | o | x | o | o | o | o | 2 | o | 1 |
| 13 | *d* | o | o | o | 1 | o | o | o | o | 1 | o | o | 1 | o | o | o | o | o | o |
| 14 | *d* | x | o | o | 1 | x | x | o | x | 2 | o | 2 | o | x | 1 | o | 2 | 2 | 1 |
| 15 | *b* | x | o | o | 1 | 2 | x | o | x | 2 | 2 | o | 1 | o | 1 | o | 2 | 2 | 1 |
| 16 | *b* | x | o | o | o | 2 | 2 | o | 2 | 2 | 2 | o | 1 | o | o | o | 2 | 2 | o |
| 17 | *th* | 2 | o | o | 1 | 1 | x | o | 2 | 1 | o | o | x | o | 1 | 1 | x | 1 | 1 |
| 18 | *th* | x | 2 | 2 | 2 | x | x | 2 | x | x | x | x | x | x | o | 2 | x | x | o |
| 19 | *g* | 2 | o | o | o | o | o | o | o | o | o | 2 | o | 2 | o | o | 2 | 2 | o |
| 20 | *g* | x | 2 | 2 | 2 | x | x | 2 | x | x | 2 | 2 | o | 2 | 2 | o | x | x | 2 |
| 21 | *dg* | o | o | o | 1 | o | o | 1 | 1 | o | o | 2 | o | o | o | o | o | o | 1 |
| 22 | *dg* | x | 2 | o | 2 | o | 2 | o | x | x | 2 | 2 | o | o | o | o | 2 | o | o |
| 23 | *v* | 2 | o | o | o | 2 | 2 | o | 2 | 2 | 2 | o | o | 2 | 2 | o | 2 | o | o |
| 24 | *ts* | x | 2 | o | 1 | 2 | x | o | 2 | 2 | 2 | x | o | 2 | o | o | 2 | 2 | o |
| 25 | *ts* | x | o | o | o | o | 2 | o | 2 | 2 | o | 2 | o | o | 2 | o | 1 | o | 1 |
| 26 | *j* | x | 2 | o | x | 2 | x | 2 | x | x | x | x | x | 2 | o | o | x | 2 | 1 |
| 27 | - | o | o | o | o | o | 2 | o | o | 2 | o | o | 2 | o | 2 | o | o | 2 | o |
| 28 | - | x | 2 | 2 | x | x | x | 2 | x | x | x | x | o | 2 | 2 | 2 | x | x | o |

REPLACEMENT TABLE FOR PLOSIVE SOUNDS:

(o) NO AUDIBLE ARTIFACTS;
(x) AUDIBLE ARTIFACTS (CLICKS);
(1) ACCEPTABLE AUDIBLE ARTFACTS (LACK OF CLARITY);
(2) ACCEPTABLE AUDIBLE ARTIFACTS (CLICKS).

*FIG. 13*

BIT ALLOCATION
FOR THE PLOSIVE SIGNAL MODEL

| PARAMETER | NUMBER OF BITS |
|---|---|
| FLAG | 1 |
| POSITION | 1 |
| GAIN | 2 |
| TOTAL | 4 |

*FIG. 14*

PITCH AND VOICING LEVEL QUANTIZER

| CODE | INDEX | CODE | INDEX | CODE | INDEX | CODE | INDEX |
|---|---|---|---|---|---|---|---|
| 0x0 | UNVOICED | 0x20 | UNVOICED | 0x40 | UNVOICED | 0x60 | UNVOICED |
| 0x1 | UNVOICED | 0x21 | ERASURE | 0x41 | ERASURE | 0x61 | 68 |
| 0x2 | UNVOICED | 0x22 | ERASURE | 0x42 | ERASURE | 0x62 | 69 |
| 0x3 | ERASURE | 0x23 | 16 | 0x43 | 42 | 0x63 | 70 |
| 0x4 | UNVOICED | 0x24 | ERASURE | 0x44 | ERASURE | 0x64 | 71 |
| 0x5 | ERASURE | 0x25 | 17 | 0x45 | 43 | 0x65 | 72 |
| 0x6 | ERASURE | 0x26 | 18 | 0x46 | 44 | 0x66 | 73 |
| 0x7 | 0 | 0x27 | 19 | 0x47 | 45 | 0x67 | 74 |
| 0x8 | UNVOICED | 0x28 | ERASURE | 0x48 | ERASURE | 0x68 | 75 |
| 0x9 | ERASURE | 0x29 | 20 | 0x49 | 46 | 0x69 | 76 |
| 0xA | ERASURE | 0x2A | 21 | 0x4A | 47 | 0x6A | 77 |
| 0xB | 1 | 0x2B | 22 | 0x4B | 48 | 0x6B | 78 |
| 0xC | ERASURE | 0x2C | 23 | 0x4C | 49 | 0x6C | 79 |
| 0xD | 2 | 0x2D | 24 | 0x4D | 50 | 0x6D | 80 |
| 0xE | 3 | 0x2E | 25 | 0x4E | 51 | 0x6E | 81 |
| 0xF | 4 | 0x2F | 26 | 0x4F | 52 | 0x6F | 82 |
| 0x10 | UNVOICED | 0x30 | ERASURE | 0x50 | ERASURE | 0x70 | 83 |
| 0x11 | ERASURE | 0x31 | 27 | 0x51 | 53 | 0x71 | 84 |
| 0x12 | ERASURE | 0x32 | 28 | 0x52 | 54 | 0x72 | 85 |
| 0x13 | 5 | 0x33 | 29 | 0x53 | 55 | 0x73 | 86 |
| 0x14 | ERASURE | 0x34 | 30 | 0x54 | 56 | 0x74 | 87 |
| 0x15 | 6 | 0x35 | 31 | 0x55 | 57 | 0x75 | 88 |
| 0x16 | 7 | 0x36 | 32 | 0x56 | 58 | 0x76 | 89 |
| 0x17 | 8 | 0x37 | 33 | 0x57 | 59 | 0x77 | 90 |
| 0x18 | ERASURE | 0x38 | 34 | 0x58 | 60 | 0x78 | 91 |
| 0x19 | 9 | 0x39 | 35 | 0x59 | 61 | 0x79 | 92 |
| 0x1A | 10 | 0x3A | 36 | 0x5A | 62 | 0x7A | 93 |
| 0x1B | 11 | 0x3B | 37 | 0x5B | 63 | 0x7B | 94 |
| 0x1C | 12 | 0x3C | 38 | 0x5C | 64 | 0x7C | 95 |
| 0x1D | 13 | 0x3D | 39 | 0x5D | 65 | 0x7D | 96 |
| 0x1E | 14 | 0x3E | 40 | 0x5E | 66 | 0x7E | 97 |
| 0x1F | 15 | 0x3F | 41 | 0x5F | 67 | 0x7F | 98 |

*FIG. 15*

BIT ALLOCATION PER FRAME

| PARAMETERS | VOICED | UNVOICED |
|---|---|---|
| LSF's | 25 | 25 |
| FOURIER MAGNITUDES | 8 | - |
| GAIN (2 PER FRAME) | 8 | 8 |
| PITCH, OVERALL VOICING | 7 | 7 |
| BANDPASS VOICING | 4 | - |
| APERIODIC FLAG | 1 | - |
| ERROR PROTECTION | - | 13 |
| SYNC BIT | 1 | 1 |
| TOTAL BITS / 22.5 ms. FRAME | 54 | 54 |

*FIG. 16A*

BIT TRANSMISSION ORDER FOR VOICED AND UNVOICED FRAMES

| BIT | VOICED | UNVOICED | BIT | VOICED | UNVOICED | BIT | VOICED | UNVOICED |
|---|---|---|---|---|---|---|---|---|
| 1 | G(2)-1 | G(2)-1 | 19 | LSF(1)-7 | LSF(1)-7 | 37 | G(1)-1 | G(1)-1 |
| 2 | BP-1 | FEC(1)-1 | 20 | LSF(4)-6 | LSF(4)-6 | 38 | BP-3 | FEC(1)-3 |
| 3 | P-1 | P-1 | 21 | P-4 | P-4 | 39 | BP-2 | FEC(1)-2 |
| 4 | LSF(2)-1 | LSF(2)-1 | 22 | LSF(1)-6 | LSF(1)-6 | 40 | LSF(2)-2 | LSF(2)-2 |
| 5 | LSF(3)-1 | LSF(3)-1 | 23 | LSF(1)-5 | LSF(1)-5 | 41 | LSF(3)-4 | LSF(3)-4 |
| 6 | G(2)-4 | G(2)-4 | 24 | LSF(2)-6 | LSF(2)-6 | 42 | LSF(2)-3 | LSF(2)-3 |
| 7 | G(2)-5 | G(2)-5 | 25 | BP-4 | FEC(1)-4 | 43 | LSF(3)-3 | LSF(3)-3 |
| 8 | LSF(3)-6 | LSF(3)-6 | 26 | LSF(1)-4 | LSF(1)-4 | 44 | LSF(3)-2 | LSF(3)-2 |
| 9 | G(2)-2 | G(2)-2 | 27 | LSF(1)-3 | LSF(1)-3 | 45 | LSF(4)-4 | LSF(4)-4 |
| 10 | G(2)-3 | G(2)-3 | 28 | LSF(2)-5 | LSF(2)-5 | 46 | LSF(4)-3 | LSF(4)-3 |
| 11 | P-5 | P-5 | 29 | LSF(4)-5 | LSF(4)-5 | 47 | AF | FEC(4)-3 |
| 12 | LSF(3)-5 | LSF(3)-5 | 30 | FM-1 | FEC(4)-1 | 48 | LSF(4)-2 | LSF(4)-2 |
| 13 | P-6 | P-6 | 31 | LSF(1)-2 | LSF(1)-2 | 49 | FM-5 | FEC(3)-3 |
| 14 | P-2 | P-2 | 32 | LSF(2)-4 | LSF(2)-4 | 50 | FM-4 | FEC(3)-2 |
| 15 | P-3 | P-3 | 33 | FM-8 | FEC(2)-3 | 51 | FM-3 | FEC(3)-1 |
| 16 | LSF(4)-1 | LSF(4)-1 | 34 | FM-7 | FEC(2)-2 | 52 | FM-2 | FEC(4)-2 |
| 17 | P-7 | P-7 | 35 | FM-6 | FEC(2)-1 | 53 | G(1)-3 | G(1)-3 |
| 18 | LSF(1)-1 | LSF(1)-1 | 36 | G(1)-2 | G(1)-2 | 54 | SYNC | SYNC |

NOTES: G = GAIN
P = PITCH/VOICING
FEC = FORWARD ERROR CORRECTION PARITY BITS
BIT 1 = LEAST SIGNIFICANT BIT
BP = BANDPASS VOICING
LSF = LINE SPECTRAL FREQUENCIES
FM = FOURIER MAGNITUDES
AF = APERIODIC FLAG
HIGHLIGHTED BITS = 24 MOST SIGNIFICANT MELP BITS
THE SYNC BIT ALTERNATES BETWEEN 0 AND 1 FROM FRAME TO FRAME

*FIG. 16B*

APPARATUS AND QUALITY ENHANCEMENT ALGORITHM FOR MIXED EXCITATION LINEAR PREDICTIVE (MELP) AND OTHER SPEECH CODERS

CLAIM OF PRIORITY

This application claims priority to U.S. Provisional Application Ser. No. 60/118,644 to Unno et al., filed Feb. 4, 1999, which is incorporated herein by reference.

FIELD OF THE INVENTION

The present invention relates to speech signal coding using a parametric coder to model a speech waveform. The speech signal parameters are communicated via a communications channel and used to synthesize the speech waveform at the receiver. More specifically, the present invention enhances the speech quality and reduces the computations of the mixed excitation linear predictive (MELP) speech coder.

BACKGROUND OF THE INVENTION

Low bit-rate speech coding technology is widely used for digital voice communication in narrow-bandwidth channels. The common objective of this technology is to transfer the digital speech signal information at a low bit rate (typically 2,400 bits/sec) while providing good quality speech synthesis at the destination. This technology also strives to provide low computational complexity, low memory requirements, and a small algorithmic delay particularly for real-time low-cost voice communications. FIG. 1A illustrates the general environment surrounding speech encoders and decoders as used in a one-way communications system. Full duplex communications are easily enabled by integrating both an encoder and decoder at both ends of the communications system.

The first widely used low bit-rate speech coder was the Federal Standard linear predictive coding (LPC) vocoder (FS1015) in which either a periodic pulse train or white noise excites an all-pole filter in order to synthesize speech. While the 2.4 kbps bit rate was attractive, the LPC vocoder was not acceptable for many speech applications as users characterized the synthesized speech as synthetic and buzzy.

The LPC vocoder analyzes the speech waveform and extracts such parameters as filter coefficients, pitch period, voicing decision, and gain are updated every 20–30 ms and transmitted to the communications channel. The artifacts residing in the traditional LPC vocoder include buzzes, clicks, and tonal noise. In addition, the speech quality is very poor in the presence of background noise. These unintended additions to the synthesized speech are the result of the simple excitation model and the binary voicing decision error.

Over the years, several low bit-rate speech coding algorithms have been developed, and some state-of-the-art coders now provide a good natural quality. The mixed excitation linear predictive (MELP) coder is one of these speech coders. The MELP coder is a linear-prediction-based speech coder includes five features not found in the LPC vocoder: mixed excitation, aperiodic pulses, adaptive spectral enhancement, pulse dispersion, and Fourier magnitude modeling. These features improve the synthesized speech quality by removing distortions resident in the LPC vocoder. FIG. 1B and FIG. 1C illustrate block diagrams of the MELP encoder and decoder respectively.

However, the MELP still has some perceivable distortions, particularly around the non-stationary speech segments and for some low-pitch male speakers. These distortions can also be observed with other low bit-rate speech coders. The distortion around the non-stationary speech segments results from the update of speech parameters at a low frame rate (typically 30–50 frames/sec). It is known that increasing the frame rate helps to solve this problem. Unfortunately, this solution requires a much higher bit rate. Another possible solution is a variable frame-rate system that updates the speech parameters in the less stationary segments at a higher frame rate while maintaining a low frame rate in the stationary segments. Such an approach is provided by the delayed decision approach based on dynamic programming, which uses the future frame information to control the frame rate. This system can produce high-quality speech while maintaining a relatively low bit rate by reducing the average frame rate. However, this method requires a considerably longer algorithmic delay (around 150 ms), which is unacceptable in many applications (such as two-way voice communications).

The distortion for low-pitch male speakers in the MELP is characterized by a high-pass filtered quality of the coded speech. In other words, the synthesized speech lacks "sound pressure" in the low frequencies. This distortion is caused by a post filter and a preprocessing high-pass filter, which are used in the modern low bit-rate speech coders to remove 60 Hz noise and to enhance the coded speech quality. These filters suppress the harmonic magnitudes in the low frequencies, particularly for low-pitch male speakers whose fundamental frequencies are less than 100 Hz. The suppression of these low frequency harmonics results in a high-pass filtered speech that is perceived as too synthetic.

The most significant speech distortion present in the prior art is the lack of a suitable model or method to accurately synthesize a plosive sound. Plosive sounds are characterized by the sudden opening or closing of the vocal chords. Plosive phonemes are created when most English speaking persons create sounds such as:"b," "d," "g," "k," "p," "t," "th," "ch," or "tch." It is important to note that the preceding list of plosive phonemes is not exclusive and that not all speakers will create like sounds. Plosive phonemes may be created both at the start and at the end of syllables (i.e. "pop," "tank," "tot"), at the end of syllables (i.e. "sound," "sat", "shrug") or at the start of syllables (i.e. "toy." "boy," "boss"). Plosive sounds are easily identified in a speech waveform but difficult to model and synthesize in low bit-rate speech coders. Plosive sounds are characterized by an impulse of energy followed by a brief period where the speech waveform is aperiodic. Prior art speech encoders have been unable to model and synthesize plosive sounds in a manner acceptable to the human ear.

SUMMARY OF THE INVENTION

As described briefly, an object of the present invention is to enhance the coded speech quality of the existing low bit rate speech coders including the MELP vocoder while maintaining its low bit rate, small algorithmic delay, and low computational complexity.

Another object of the present invention is to provide an efficient mixed excitation algorithm to reduce the computational complexity of the existing MELP vocoder. Another object of the present invention is to provide bit-stream compatibility with the existing MELP vocoder in order to permit the introduction of the invention into systems where only the present MELP decoder is available. This would allow for backward compatibility through the introduction of an updated encoder while allowing for full system upgrades where both the encoder and the decoder could be updated.

The present invention provides four embodiments. The first is a robust pitch detection algorithm. In the encoder, the fixed-length pitch analysis window is manipulated around the original position to seek the position that contains the signal with the highest pitch correlation. Once the window position is determined, pitch is estimated using the signal that is contained in the selected window. Other parameters such as LPC coefficients, gain, and voicing decision are also estimated using the signal corresponding to the selected window. The estimated parameters are used to synthesize the coded speech in the decoder on each sample window in the same manner as earlier fixed-position windows in the prior art.

The second embodiment is a plosive analysis/synthesis method. In the encoder, the system first detects the frame that contains the plosive signal. The plosive detection is performed with sliding-window peakiness analysis. The detected plosive signal is quantized to only a small number of bits and transmitted via the communication channel to the decoder. In the decoder, the plosive signal is synthesized independently and added back to the coded speech.

The third embodiment is a post processor for the Fourier magnitude model. In the decoder, the harmonic magnitudes of the coded speech in the low frequencies are emphasized to overcome the muffling effect of the high pass filter. In this way, the decoded speech is synthesized without the muffling effect often observed in the high-pass filtered speech of current low bit-rate speech encoders.

The fourth embodiment is a new mixed excitation algorithm. In the decoder, a pulse train is mixed with random noise in the frequency domain in unvoiced frequency bands to eliminate the band-pass filtering operations, which are required to generate the mixed excitation signal in the existing MELP coder. The elimination of the filters results in a significant reduction of computational complexity in the MELP decoder. As a result, the present system is shown to be compatible in terms of bit-stream and is interchangeable with the coder/decoder of the existing MELP speech coder.

BRIEF DESCRIPTION OF THE DRAWINGS

The present invention will be more fully understood from the accompanying drawings of the embodiments of the invention, which however, should not be taken to limit the invention to the specific embodiments enumerated, but are for explanation and for better understanding only. Finally, like reference numerals in the figures designate corresponding parts throughout the drawings.

FIGS. 3A1–3A3 illustrate plosive signal types and locations in a sample sentence and reveal how plosive sounds remain undetected in the prior art;

FIGS. 3B1–3B3 illustrate plosive signal synthesis in coded speech;

FIG. 12 illustrates words with plosive sounds;

FIG. 13 illustrates the replacement of different plosive types in the present invention;

FIG. 14 reveals the bit allocation for the plosive signal model;

FIG. 15 reveals the 99-level Pitch and Voicing level quantization in the existing MELP;

FIG. 16A reveals the bit allocation in the existing MELP frame; and

FIG. 16B reveals the bit transmission order in the existing MELP frame.

DESCRIPTION OF THE PREFERRED EMBODIMENT

Figure 2A:
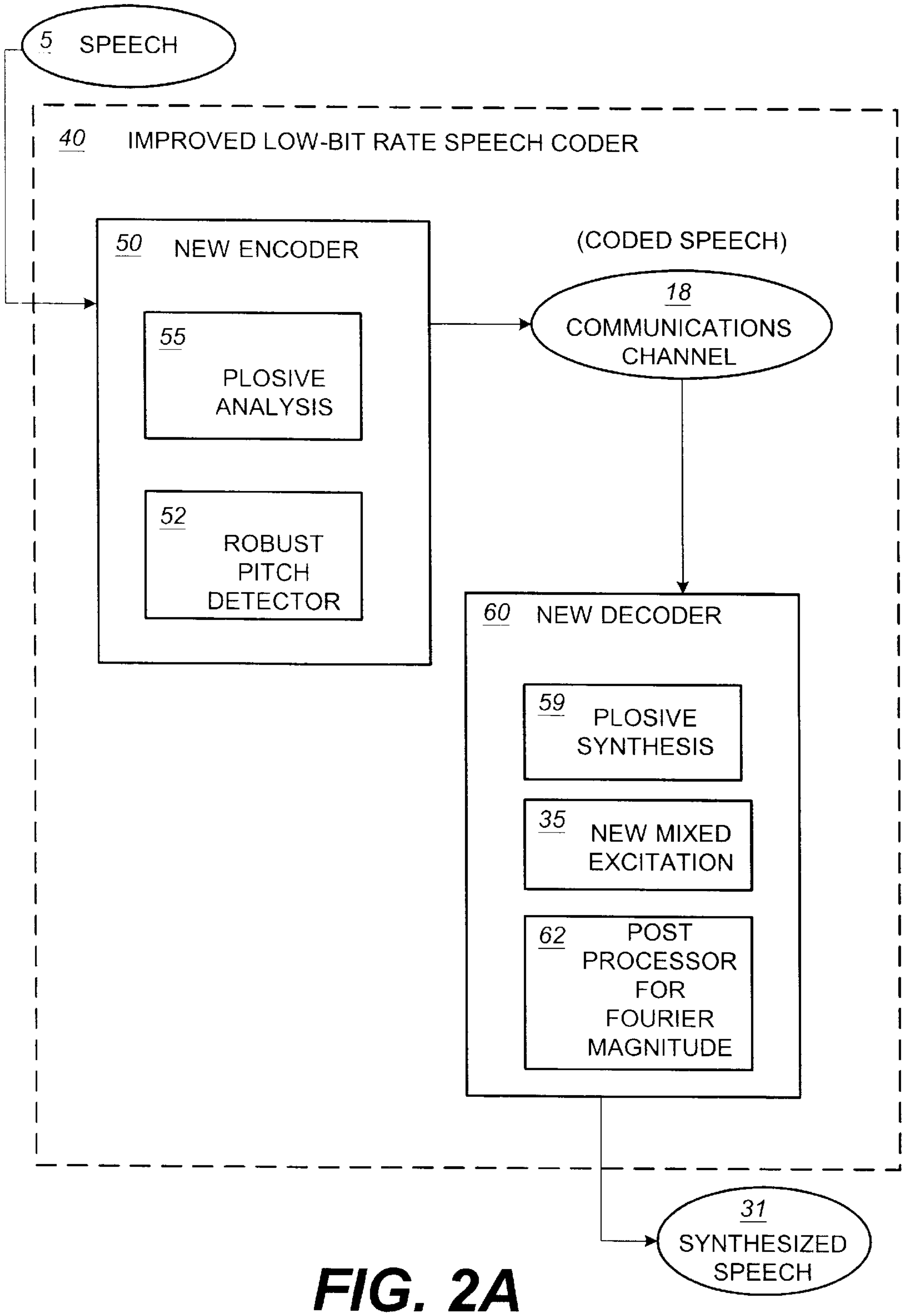
FIG. 2A is a block diagram highlighting the new embodiments of the present system.

The present invention is embedded in the existing MELP coder as shown in FIG. 2A to enhance coded speech quality. It will be apparent to those skilled in the art that the MELP coder can be replaced with other low bit-rate speech coders that are based on a parametric speech coding algorithm in order to practice the current invention. The present invention consists of four embodiments. The first embodiment, a robust pitch detector, is shown as 52 in FIG. 2A. The robust pitch detector 52 replaces a portion of the refinement of pitch and voicing decision 37 in the MELP coder and does not require additional bits for transmission.

The second embodiment, the plosive analysis/plosive synthesis function is illustrated in FIG. 2A. Plosive analysis 55 is added to the encoder. Plosive synthesis 59 is added to the decoder and requires two bits for transmission.

The third embodiment, a post processor for the Fourier magnitude 62, is shown in FIG. 2A. It is added to the decoder and does not require additional bits for transmission.

The fourth embodiment, a new mixed excitation 35, is also shown in FIG. 2A. It replaces the mixed excitation method of the prior art. The new mixed excitation 35 is embedded in the decoder, and does not require additional bits for transmission.

MELP Encoder

Figure 1A:
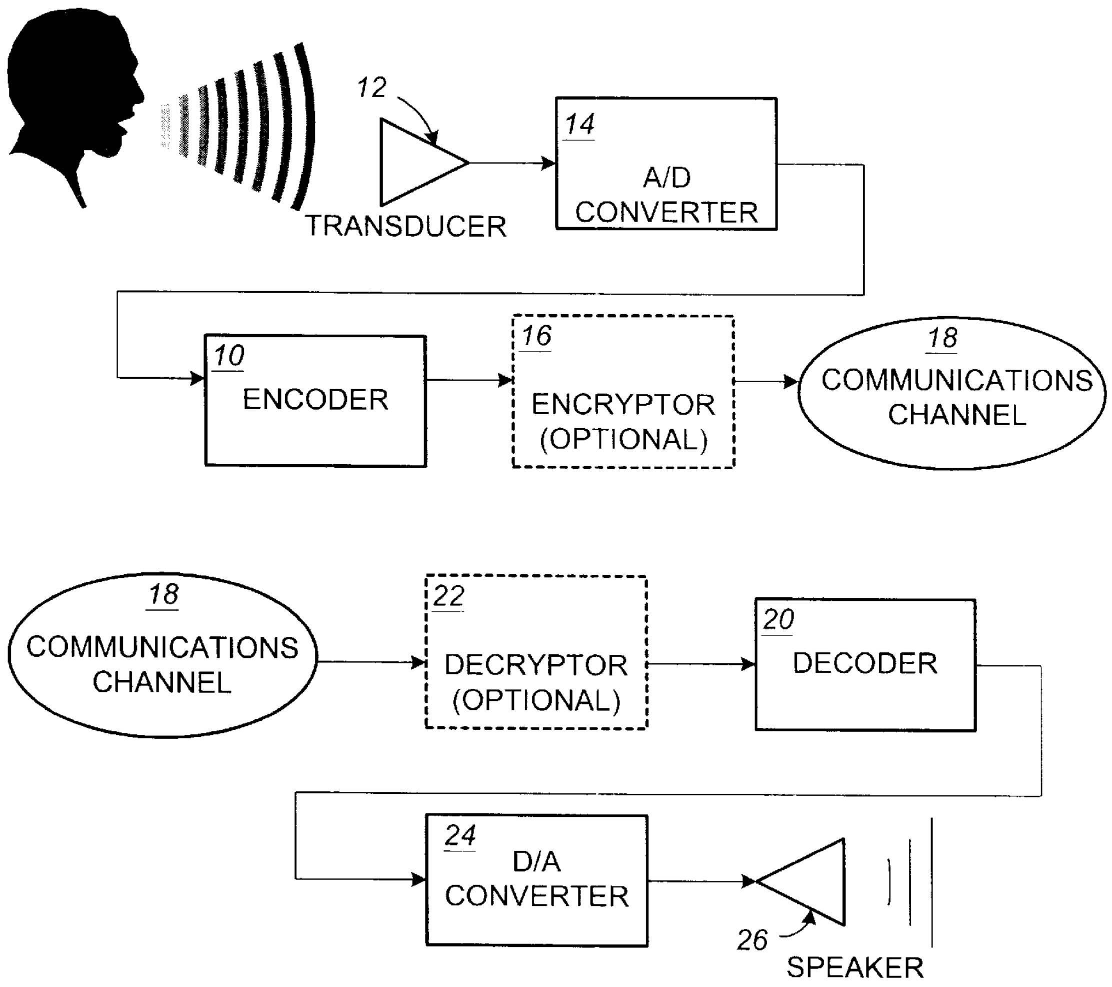
(PRIOR ART) FIG. 1A
FIG. 1A is a block diagram of a communications system having a MELP speech encoder and decoder.
Figure 1B:
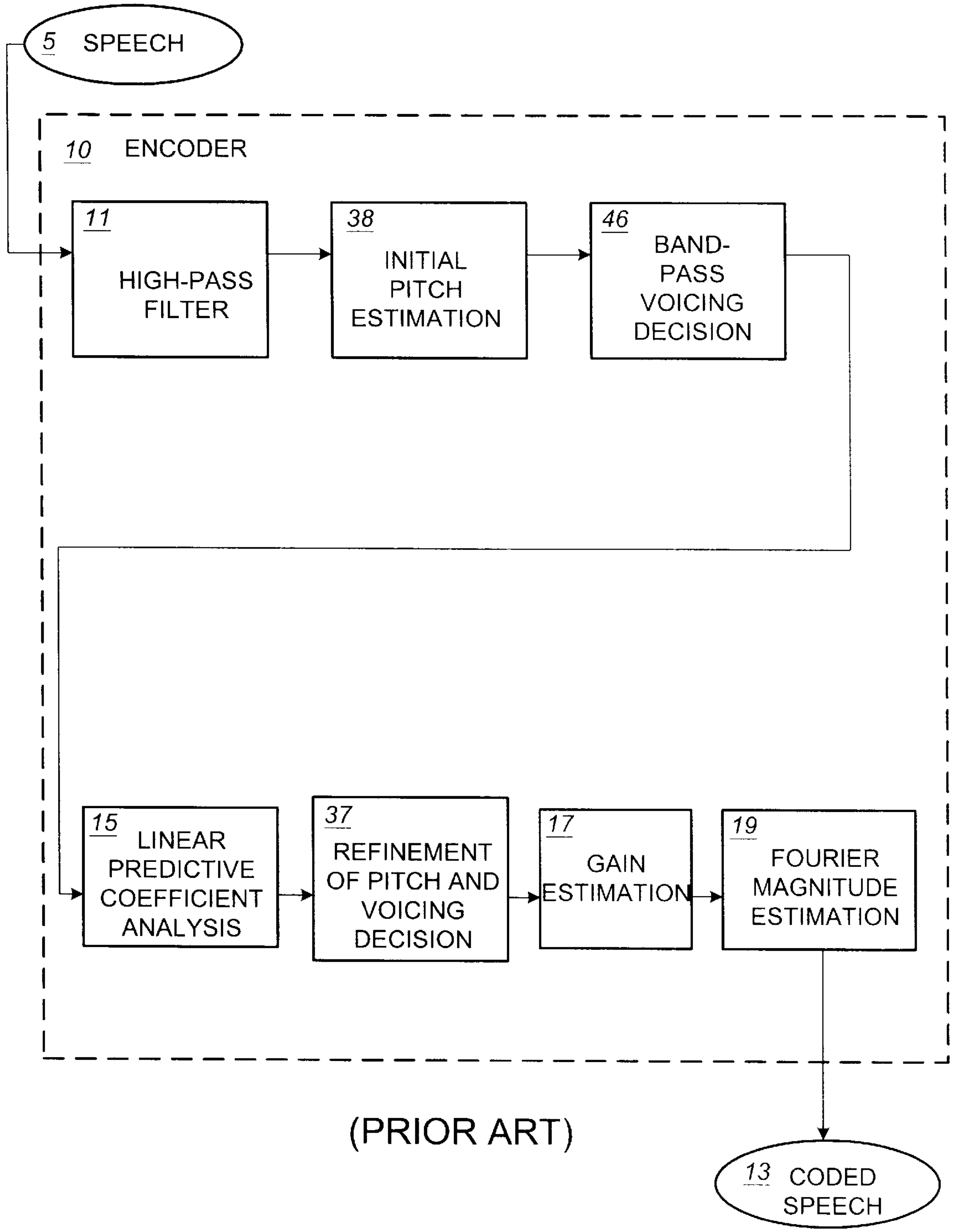
(PRIOR ART) FIG. 1B
FIG. 1B is a block diagram illustrating the MELP encoder of FIG. 1A.
Figure 1C:
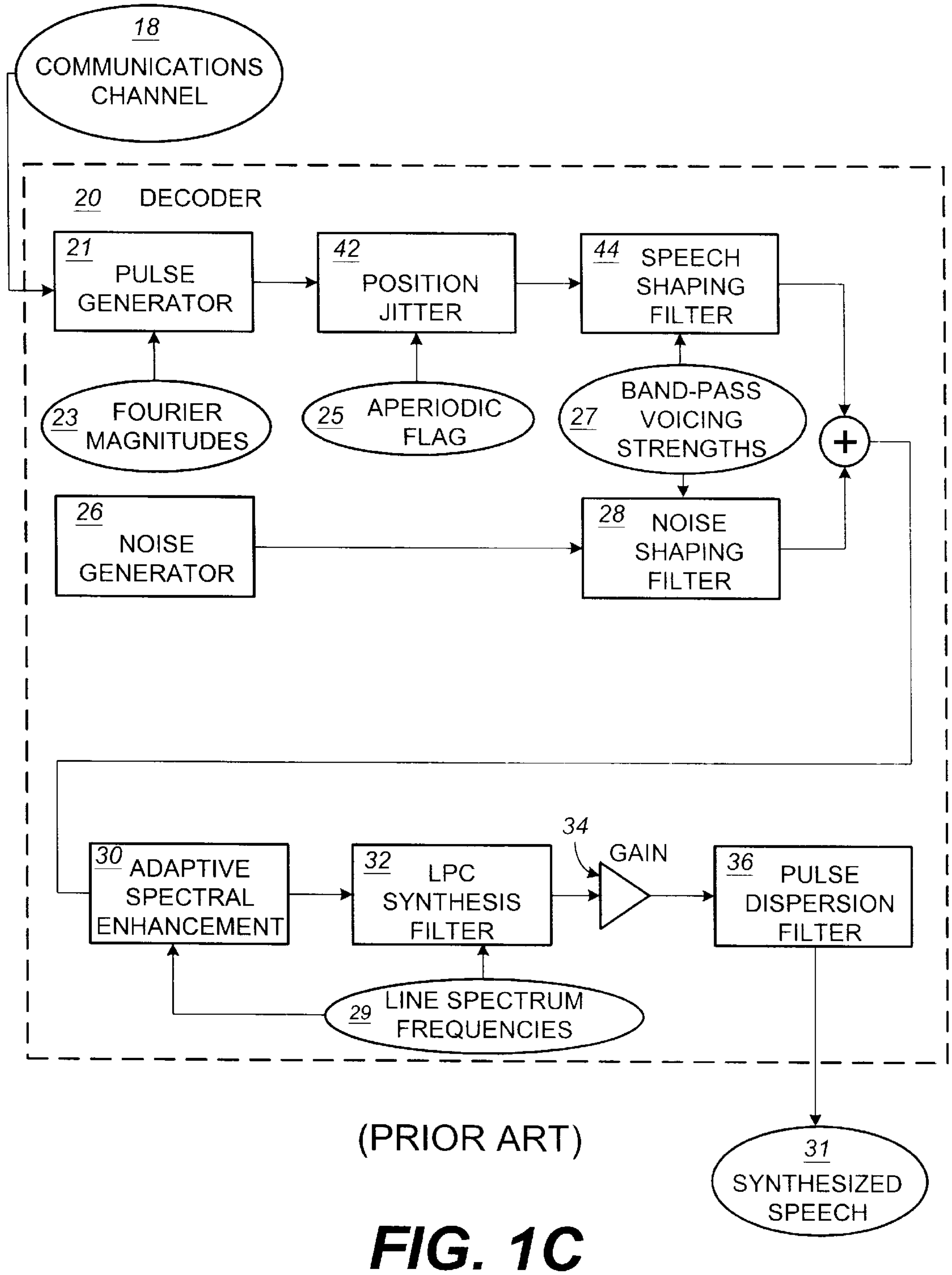
(PRIOR ART) FIG. 1C
FIG. 1C is a block diagram illustrating the MELP decoder of FIG. 1A.

FIG. 1B illustrates a block diagram of the processing flow within the MELP encoder. A frame of speech data is processed by the MELP coder every 22.5 ms. Each frame contains 180 voice samples or 8,000 samples per second. The MELP is a parametric speech coder that creates a 54-bit per frame concatenated code that is used by the MELP decoder to synthesize the speech waveform at the receiver. Each frame contains the following parameters: Line Spectral Frequencies (LSFs), Fourier Magnitudes, Gain, Pitch, Band-pass Voicing, Aperiodic Flag, Error Protection (in unvoiced frames only), and a synchronization bit.

Input speech is encoded as follows. First, the input speech signal is processed through high-pass filter 11 with a cut-off frequency of 60 Hz to remove low-frequency noise. A buffer containing the most recent samples of the actual input speech signal is maintained in the encoder. One of the samples is identified as the last sample of the current frame. The buffer contains samples that extend beyond the current frame both in the past and into the future to enable the coding process. This designated last frame of the sample is the reference point for many of the encoder calculations.

Figure 2B:
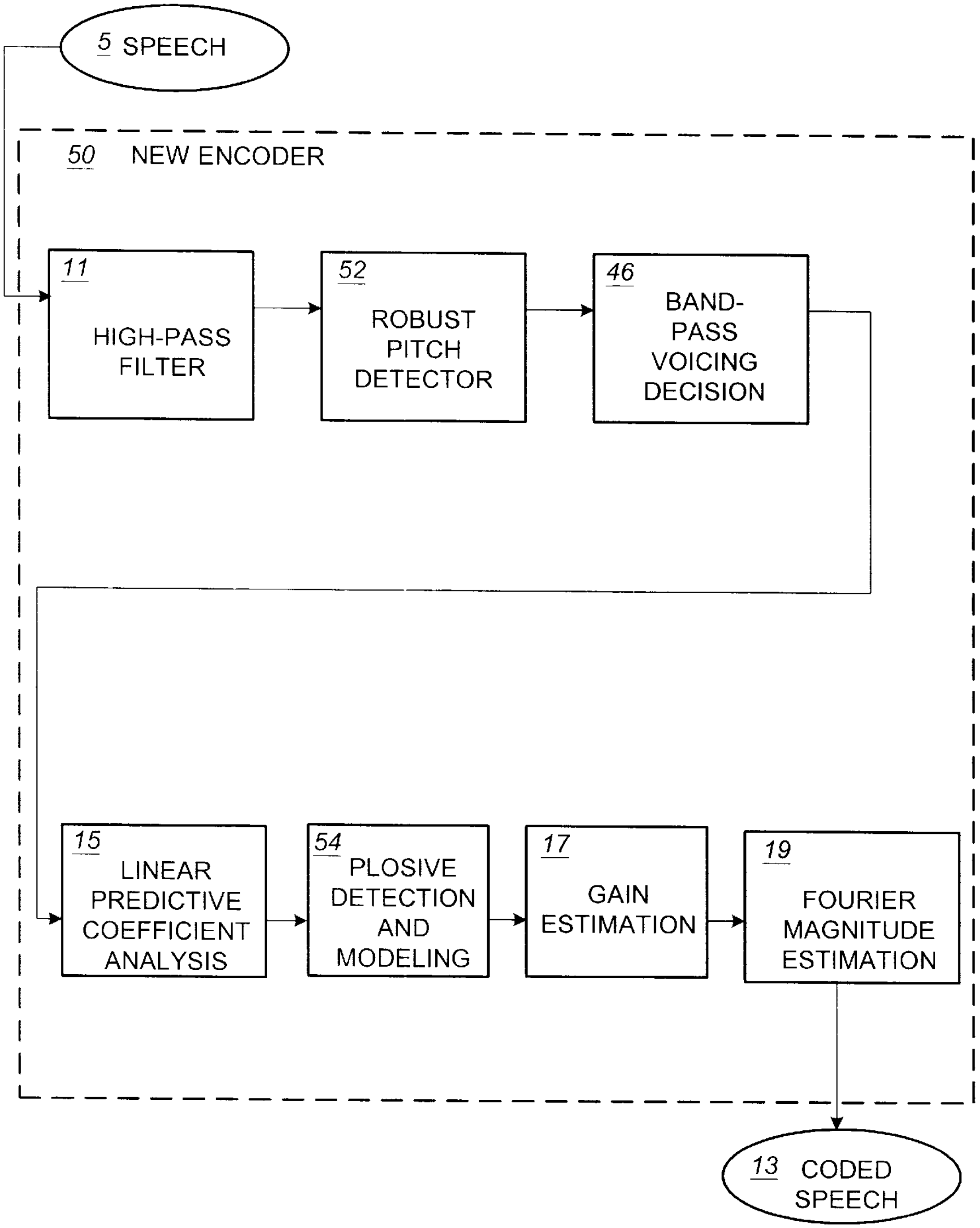
FIG. 2B is a block diagram illustrating the new encoder of FIG. 2A.

Next, the speech signal is band-passed filtered into 5 frequency bands from 0–500, 500–1000, 1000–2000, 2000–3000, and 3000–4000 Hz for voicing analysis. An initial pitch estimation is made using the 0–500 Hz filter output signal. The measurement is centered on the filter output produced when its input is the last sample in the current frame. The initial pitch estimation from the first band-pass filter is used as the initial reference point for robust pitch detector 52 (FIG. 2B). For each of the remaining frequency bands, the band-pass voicing strength is determined using the pitch determined by the robust pitch detector 52 described below. The time envelopes of each of the band-pass filters are calculated by full-wave rectification followed by a smoothing filter. The analysis windows for each of the remaining frequency bands are centered on the last sample in the current frame as in the case of the first band.

Robust Pitch Detection Most low bit-rate speech coders use the normalized pitch correlation to estimate pitch lag. In the MELP coder, the pitch correlation is also used to make band-pass voicing decisions. The normalized pitch correlation r(T) is computed with the signal in the fixed-position analysis window in the prior art as follows:

$$r(T) = \frac{c_T(0, T)}{\sqrt{c_T(0, 0)c_T(T, T)}}, \qquad \text{Eq. (1)}$$

$$c_T(m, n) = \sum_{k=-\frac{T}{2}-\frac{N}{2}}^{-\frac{T}{2}+\frac{N}{2}-1} s_{k+m}s_{k+n}$$

where $s_k$ is the kth sample in the fixed-position window, $s_0$ is the signal at the center of the fixed-position window, T is a pitch lag and N is the number of samples accumulated for the correlation computation.

The binary voicing decision forces the MELP to use either periodic pulse or noise excitation for each frequency band even in frames containing an irregular or ill-defined pitch. As a result, noise excitation for bands inappropriately designated as noise or pitch excitation inappropriately matched with an inaccurate pitch lag leads to distortion in transitions. To solve this problem, a sliding-sample window is used in the present invention. This method seeks the pitch analysis window position that provides the highest pitch correlation by sliding the window around the original position. This is equivalent to using a more periodically stable signal rather than using a portion of the signal with an irregular pitch for pitch analysis. By using a periodically stable portion of the signal for pitch analysis, the present invention avoids inappropriate voicing decisions and pitch estimates, thus reducing the artifactual noise in the non-periodically stable signal segments.

Figure 4:
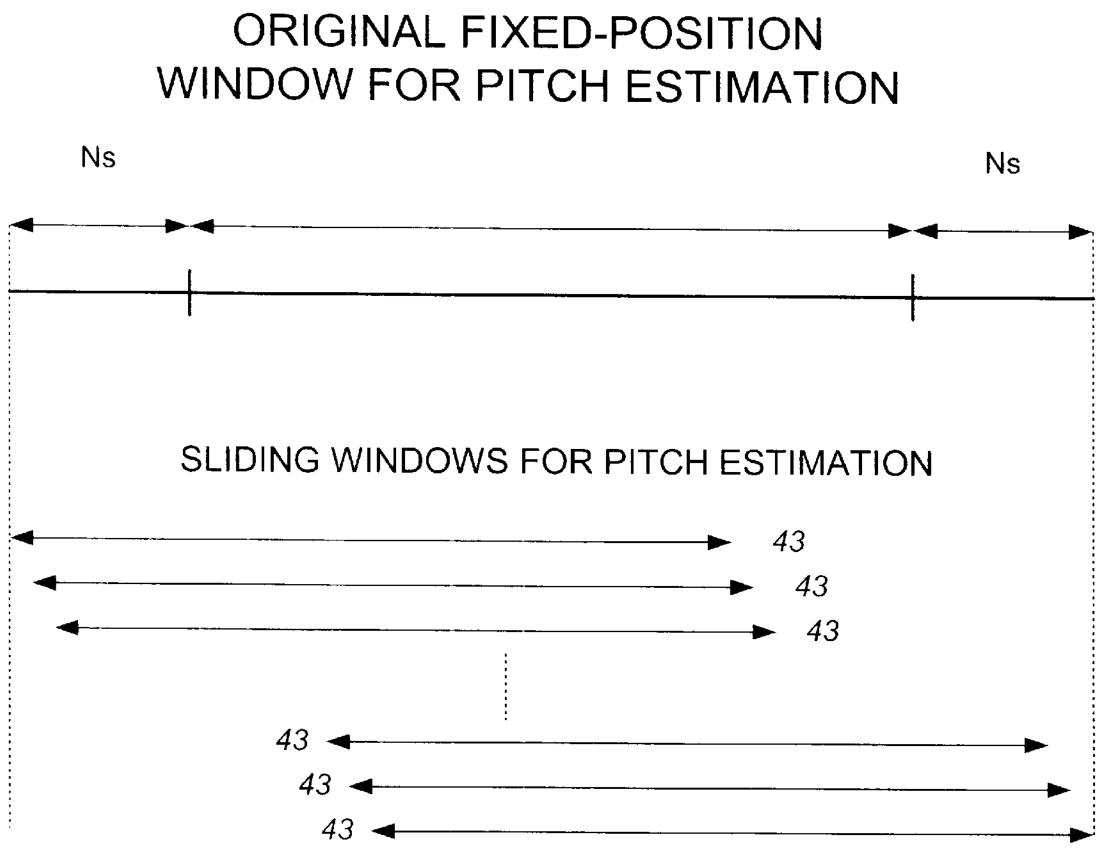
FIG. 4 illustrates the relative time shifting in the robust pitch detector shown in FIG. 2B.

FIG. 4 shows a robust pitch detector used in the present invention. In FIG. 4, the normalized pitch correlation in the window 43 is first computed in the same manner as the fixed window pitch detection as shown in Equation (1), where $s_k$ is the $k^{th}$ signal and $s_0$ is the signal at the center of the original fixed-position window. The normalized pitch correlation in the window 43 is computed recursively as follows:

$$r_i(T) = \frac{c_T(i, T+i)}{\sqrt{c_T(i, i)c_T(T+i, T+i)}}, \qquad \text{Eq. (2)}$$

where $$c_T(i, j) = c_T(i-1, j-1) + s_{i-\frac{T}{2}+\frac{N}{2}-1}s_{j-\frac{T}{2}+\frac{N}{2}-1} - s_{i-1-\frac{T}{2}-\frac{N}{2}}s_{j-1-\frac{T}{2}-\frac{N}{2}}$$

In each window, the maximum normalized pitch correlation $r_i(T_i)$ and the associated pitch lag, $T_i$, is determined and the final pitch lag selected as the pitch lag associated with the maximum normalized pitch correlation r(T) in all windows as follows:

$$r(T) = \max_{i=-N_s}^{N_s-1}\left[\max_T\{r_i(T)\}\right], \qquad \text{Eq. (3)}$$

where Ns is the maximum window-sliding range from the original fixed-position window. In the present invention, an LPC parameter, a gain, band-pass voicing decision, and fractional pitch are computed using the signal in the window that maximizes the normalized pitch correlation. A direct implementation of Equation (2) solving for $r_i(T)$ for all values of i would result in a significant increase in the computational complexity. To reduce the additional complexity, the recursion Equation (2) for $C_T(i,j)$ is used to compute the autocorrelation.

The aperiodic flag is set if $V_{bpl}$, determined in the voicing analysis for the 0 to 500 Hz band-pass, is less than 0.5 and set to 0 otherwise. When set, the flag informs the decoder that the voiced component of the excitation should be aperiodic.

A $10^{th}$ order linear prediction analysis is performed on the input speech signal using a 200 sample (25 ms) Hamming window centered on the last sample in the current frame. A traditional autocorrelation analysis procedure is implemented using Levinson-Durbin recursion. In addition, a bandwidth expansion constant of 0.994 (15 Hz) is applied to the prediction coefficients by multiplying each coefficient by the bandwidth expansion constant.

Next, a linear prediction residual signal is calculated by filtering the input speech signal with the prediction filter using the coefficients determined above and an inverse of the prediction filter using those same coefficients. The two resulting signals are summed to create the linear prediction residual signal.

Plosive Analysis

Figure 5:
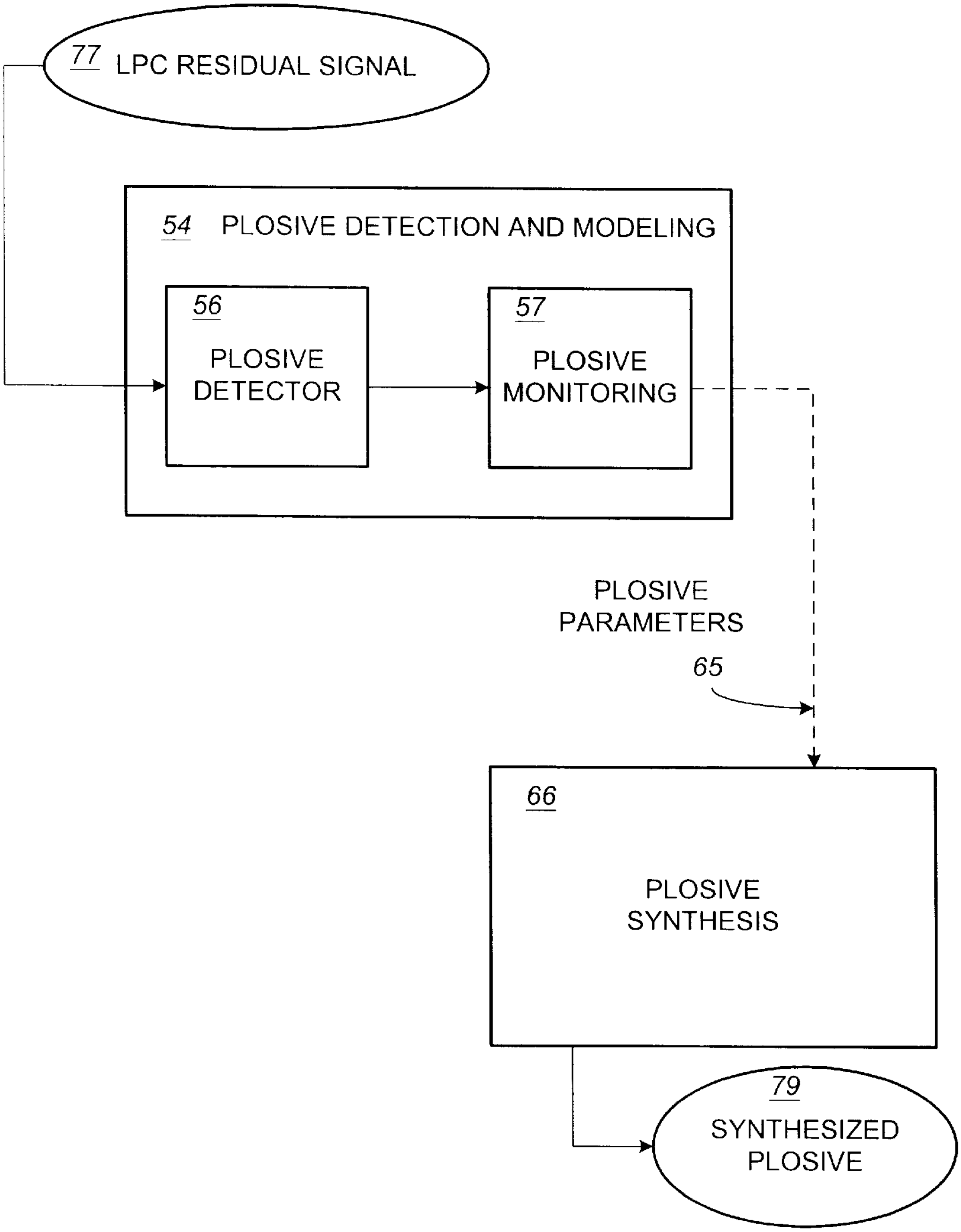
FIG. 5 illustrates a block diagram of the plosive analysis/synthesis system of the present invention as shown in FIG. 2B and FIG. 2C.

The plosive analysis/synthesis system of the current invention consists of three parts: plosive detection, plosive modeling, and plosive synthesis. FIG. 5 shows the plosive analysis/synthesis system.

Plosive Detection

Figure 6:
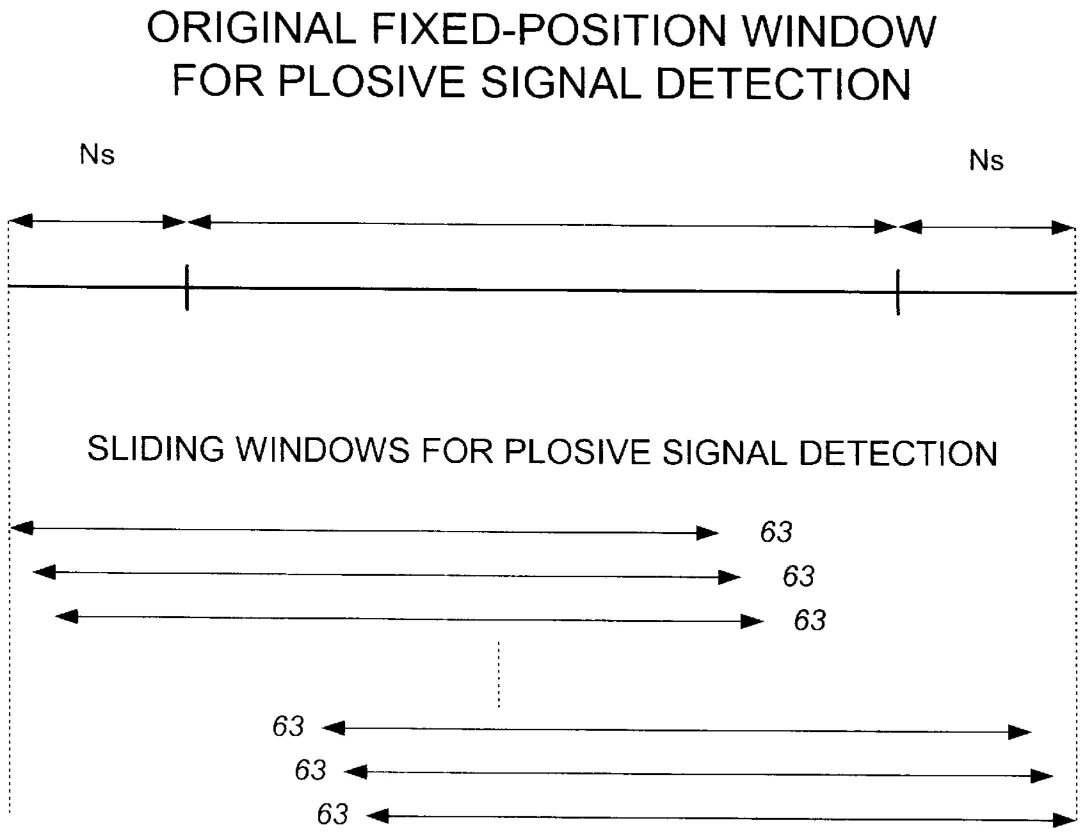
FIG. 6 illustrates the plosive detector of the present invention as shown in FIG. 5.

With reference to FIG. 5, the plosive detector 56 uses a sliding window for "peakiness" computation to detect the frame that contains a plosive signal. The peakiness value is sensitive to the phase of the plosive signal. By using a sliding window to detect a window position that maximizes the peakiness value, the phase sensitivity of the plosive is reduced. The peakiness, P, is defined as a ratio of the L2 norm to the L1 norm of the signal:

$$P = \frac{\sqrt{\frac{1}{N}\sum_{n=0}^{N-1} r_n^2}}{\frac{1}{N}\sum_{n=0}^{N-1} |r_n|}, \quad \text{Eq. (4)}$$

where $r_n$ is a LPC residual signal and N is a frame size. As shown in FIG. 6, the plosive detector slides the peakiness analysis window 63 to find the maximum peakiness value in all windows. The peakiness of each window is given by:

$$P_i = \frac{\sqrt{\frac{1}{N}\sum_{n=0}^{N-1} r_{n+i}^2}}{\frac{1}{N}\sum_{n=0}^{N-1} |r_{n+i}|} = \frac{\sqrt{\frac{1}{N}B_i}}{\frac{1}{N}A_i}, \quad \text{Eq. (5)}$$

where $P_i$ is the peakiness of the $i^{th}$ window from the past, and $r_0$ is the first LPC residual signal in the original fixed-position window. In FIG. 6, the peakiness in the window 63 ($P_{-Ns}$) is first computed. The peakiness in the window 63 is computed recursively as follows:

$$A_i = A_{i-1} + |r_{N-1+i}| - r_{i-1}|$$

$$B_i = B_{i-1} + r_{N-1+i}^2 - r_{i-1}^2 \quad \text{Eq. (6)}$$

Figure 3C:
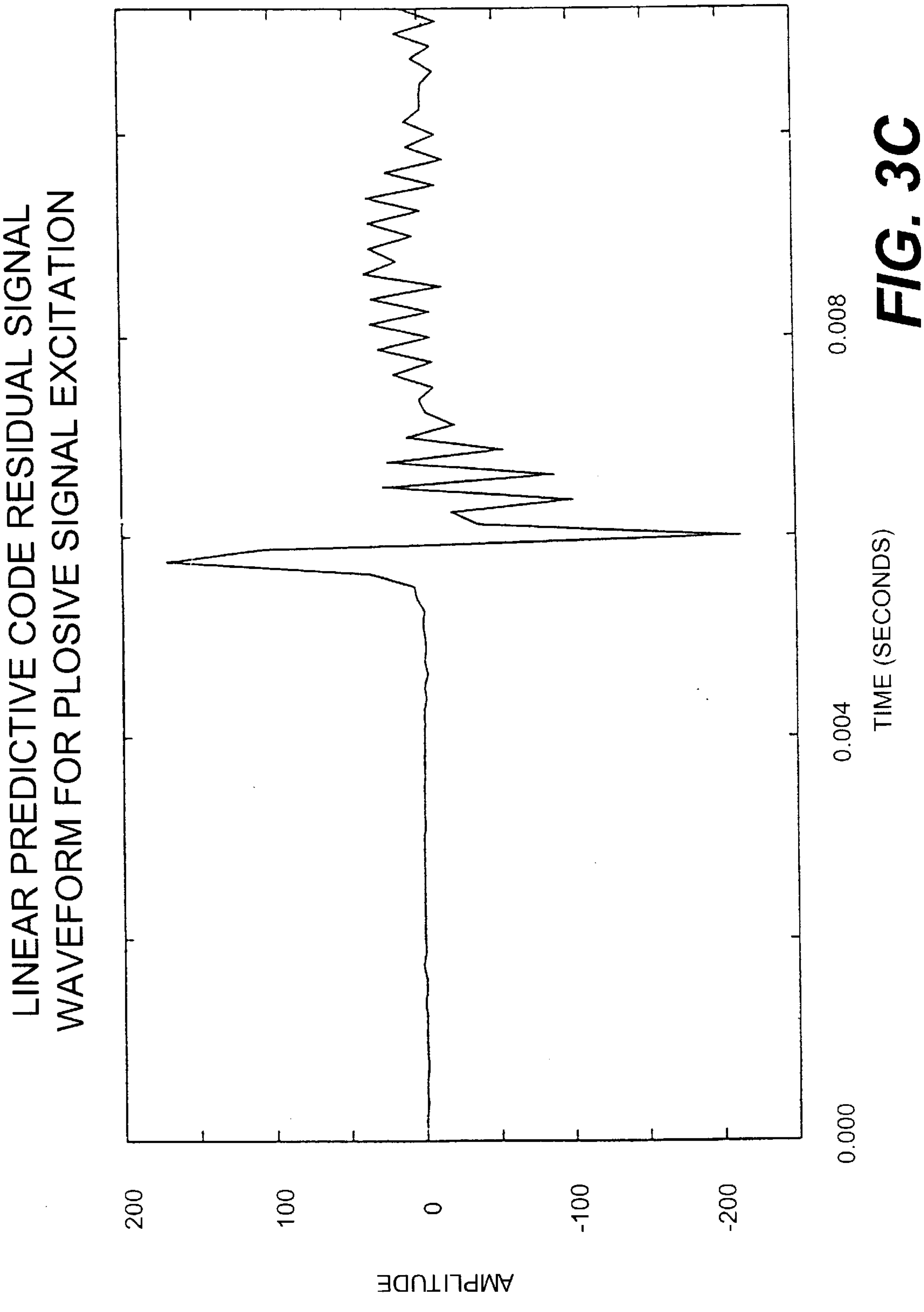
FIG. 3C illustrates a typical LPC residual waveform for a plosive signal.
Figure 3D:
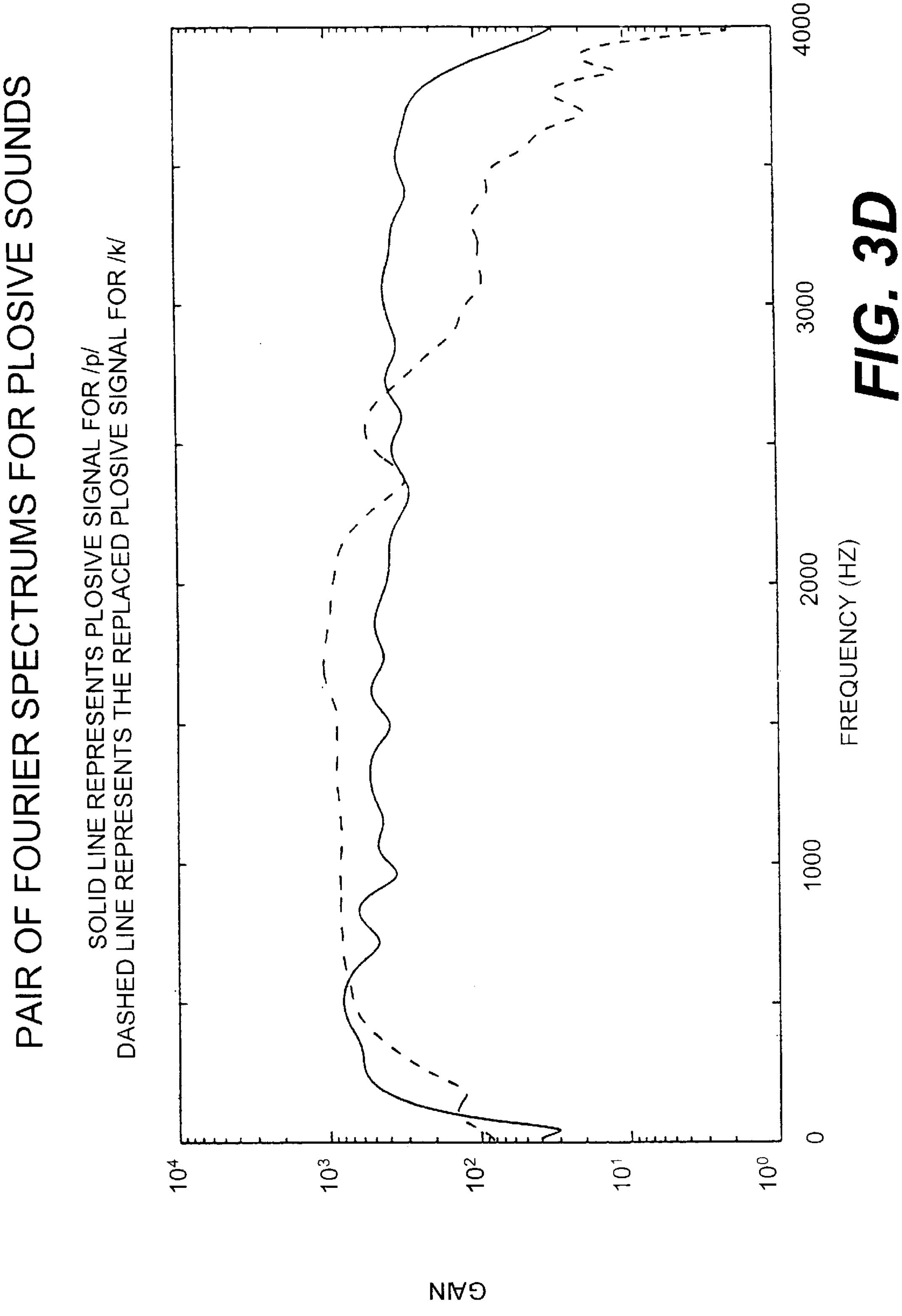
FIG. 3D illustrates the Fourier spectrums of an original plosive sound along with the replacement plosive model.
Figure 3E:
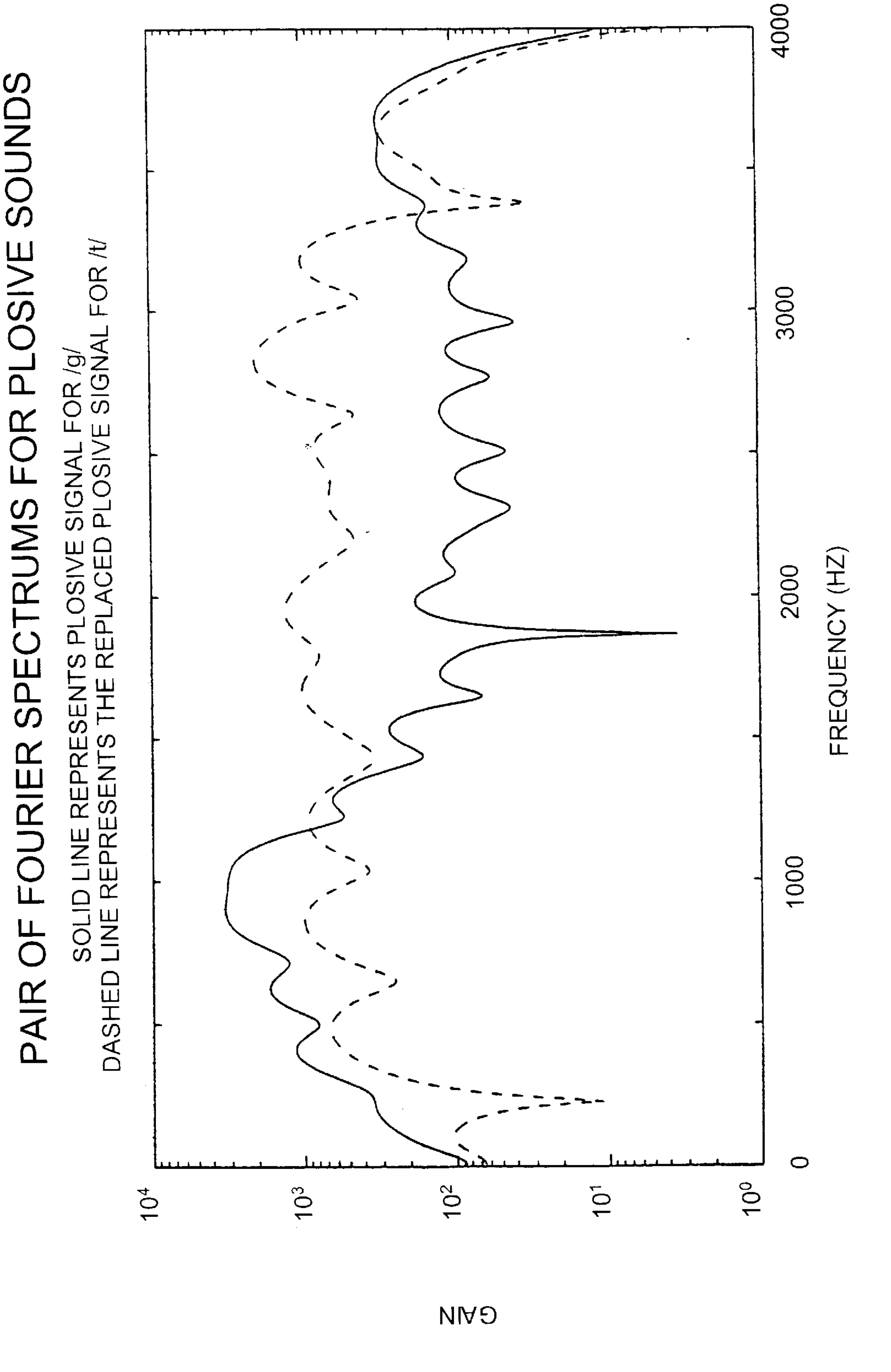
FIG. 3E illustrates the Fourier spectrums of an original plosive sound with a click with the replacement plosive model.

Then, the maximum peakiness value in all windows is used as the peakiness value P of the frame:

$$P = \max_{i=-N_s}^{N_s-1} [P_i], \quad \text{Eq. (7)}$$

where Ns is the maximum window-sliding range, which is also used for the pitch detector of the present invention. The peakiness value with the sliding window is illustrated in FIG. 3A along with that of the fixed position window and a corresponding speech input waveform. In addition to the peakiness value, the low pass energy is computed and used to distinguish the rapid onset of a vowel from the plosive signal.

Plosive Modeling

In the present invention, a simple model is applied to the plosive signal expression in plosive modeling 57 of FIG. 5 so as to minimize the additional transmission bits. FIG. 12 shows the plosive signals detectable in the English language. Analysis of the frequency spectrums associated with the identified plosive sounds in FIG. 12 reveals that the 28 separate plosive sounds could be closely represented by the frequency spectrums of 18 replacement plosive sounds by aligning the maximum amplitude positions of each plosive signal. Near transparent replacement requires at least a rough spectral fit for each frequency. FIG. 13 illustrates the replacement matrix for the plosive sounds in the current invention.

In this model, all plosive signals p(n) are produced by scaling and LPC synthesis filtering the single pre-stored template LPC residual signal v(n) as follows:

$$p(n) = g_p v(n) + \sum_{i=1}^{P} a_i p(n-1), \quad \text{Eq. (8)}$$

where, $g_p$ is the scaling factor based on the energy of the input plosive signal, and $a_1$ are the LPC coefficients computed from the input plosive signal. The template plosive signal v(n) was chosen arbitrarily and filtered with the $14^{th}$ order inverse linear prediction filter. Since only a rough spectral fit between the input and the synthesized plosive signals provides a near transparent sound, an accurate LPC analysis is not required for the input plosive signal. In order to minimize the additional bits required for the plosive model, the same $10^{th}$ order LPC model used for voiced pitch modeling is used for the production of the plosive signal.

The parameters for transmission are a plosive flag, a plosive location, and plosive gain. The gain is computed by comparing the energy of the LPC residual of the plosive signal with that of the template signal. For the specific embodiment of the present invention, the gain is quantized with two bits. The position of the plosive signal is identified by seeking the maximum amplitude position in the frame and representing the plosive signal position with one bit in either the first half or the second half of the current frame. Thus, for the specific embodiment of the present invention, the plosive signal is quantized with only four bits including one bit for a plosive flag, two bits for a plosive gain and one bit for plosive position as is shown in FIG. 14. In the present invention, plosive synthesis is performed in the MELP decoder and will be disclosed in the description of the decoder.

Next, the input speech signal gain is measured twice per frame using a pitch adaptive window length. This adaptive length is identical for both gain measurements and is determined as follows. When $V_{bp}$,>0.6, the length is the shortest multiple of $P_2$ which is longer than 120 samples. If this length exceeds 320 samples, it is divided by 2. When $V_{bpl}$ is less than or equal to 0.6, the window length is 120 samples. The gain calculation for the first window produces $G_1$ and is centered 90 samples before the last sample of the current frame. The calculation for the second window produces $G_2$ and is centered on the last sample of the current frame. The gain is the RMS value, measured in dB, of the signal in the window $s_n$:

$$G_i = 10\log_{10}\left(0.01 + \frac{1}{L}\sum_{n=1}^{L} s_n^2\right), \quad \text{Eq. (9)}$$

where L is the window length. The 0.01 offset prevents the log argument from approaching zero. If a gain measurement is less than 0.0, it is clamped to 0.0. The gain measurement assumes that the input signal range is −32768 to 32767.

Next, the encoder performs a quantization of the LPC coefficients. First, the LPC coefficients are converted into line spectrum frequencies (LSFs). All adjacent pairs of the LSF components are organized such that each is in ascending frequency order with a minimum of 50 Hz separation. The resulting LSF vector f is quantized using a multi-stage vector quantizer. The resulting vector is used in the Fourier magnitude calculation in the decoder.

The final pitch value, $P_3$, is quantized on a logarithmic scale with a 99-level uniform quantizer ranging from 20 to 160 samples. These pitch values are then mapped to a 7-bit codeword using a lookup table. The all zero codeword represents the unvoiced state and is sent if $V_{bpl}$ is less than or equal to 0.6. All 28 codewords with Hamming weight of 1 or 2 are reserved for error protection.

The two gain values are quantized as follows. $G_2$ is quantized with a 5-bit uniform quantizer ranging from 10 to 77 dB. $G_1$ is quantized to 3 bits using the following adaptive algorithm. If $G_2$ for the current frame is within 5 dB of $G_2$ for the previous frame, and $G_1$ is within 3 dB of the average of $G_2$ values for the current and previous frames, then the frame is steady-state and a code of all zeros is sent to indicate that the decoder should set $G_1$ to the mean of $G_2$ values for the current and previous frames. Otherwise, the frame represents a transition and $G_1$ is quantized with a 7-level uniform quantizer ranging from 6 dB below the minimum of the $G_1$ values for the current and previous frames to 6 dB above the maximum of those $G_2$ values.

Band-pass voicing quantization occurs as follows. When $V_{bpl}$ is less than or equal to 0.6 (unvoiced state), the remaining strengths $V_{bpl}$, i=2, 3, 4, 5 are set to 0. When $V_{bpl}$ is >0.6, the remaining voicing strengths are quantized to 1.

Fourier Magnitude calculation and quantization occurs as follows. The Fourier magnitudes of the first 10 pitch harmonics of the prediction signal residual generated by the quantized prediction coefficients. It uses a 512 point Fast Fourier Transform (FFT) of a 200 sample window centered at the end of the frame. First, a set of quantized predictor coefficients are calculated from the quantized LSF vector. Then, the residual window is generated using the quantized prediction coefficients. Next, a 200 sample Hamming window is applied, the signal is zero-padded to 512 points, and the complex FFT is performed. Finally, the complex FFT output is transformed into magnitudes and the harmonics found with a spectral peak-selecting algorithm.

The peak-selecting algorithm finds the maximum within a width of 512/P frequency samples centered around the initial estimate for each pitch harmonic, where P is the quantized pitch. This width is truncated to an integer. The initial estimate for the location of the $i^{th}$ harmonic is 512 i/P. The number of harmonic magnitudes searched for is limited to the smaller of 10 or P/4. These magnitudes are then normalized to have a RMS value of 1.0. If fewer than 10 harmonics are found, the remaining magnitudes are set to 1.0.

The 10 magnitudes are quantized with an 8-bit quantizer. The codebook is searched for a perceptually weighted Euclidean distance, with fixed weights that emphasize low frequencies over higher frequencies. The weights are given by:

$$w_i = \left[\frac{117}{25+75\left(1.4\left(\frac{f_i}{1000}\right)^2\right)^{0.69}}\right]^2, \; i = 1, 2, \ldots, 10 \qquad \text{Eq. (10)}$$

where $f_i$=8000$_i$/60 is the frequency in Hz corresponding to the $i^{th}$ harmonic for a default pitch period of 60 samples. The weights are applied to the squared difference between the input Fourier magnitudes and the codebook values.

Lastly, the MELP encoder adds error protection and structures the 54 bit frame as follows. FIG. 12 shows the bit allocation for the MELP coder. To improve performance in channel errors, the unused coder parameters for the unvoiced mode are replaced with forward error correction. Three Hamming (7,4) codes and one Hamming (8,4) code are used. The (7,4) code corrects single bit errors, while the (8,4) code detects double bit errors. The (8,4) code is applied to the 4 most significant bits (MSBs) of the first multi-stage vector quantization index, and the 4 parity bits are written over the band-pass voicing. The remaining three bits of the first multi-stage vector quantization index along with the reserved bit, are covered by a (7,4) code with the resulting 3 parity bits written to the MSBs of the Fourier series vector quantization index. The 4 MSBs of the $G_2$ codeword are protected with 3 parity bits which are written to the next 3 bits of the Fourier magnitudes. Finally, the least significant bit (LSB) of the second gain index and the 3 bit $G_1$ codeword are protected with 3 parity bits written to the 2 LSBs of the Fourier magnitudes and the aperiodic flag bit. The parity generator matrix for the Hamming (7,4) code is:

$$G_{7,4} = \begin{bmatrix} 1 & 1 & 0 & 1 \\ 1 & 0 & 1 & 1 \\ 0 & 1 & 1 & 1 \end{bmatrix}. \qquad \text{Eq. (11)}$$

The parity generator matrix for the Hamming (8,4) code is:

$$G_{8,4} = \begin{bmatrix} 1 & 1 & 0 & 1 \\ 1 & 0 & 1 & 1 \\ 0 & 1 & 1 & 1 \\ 1 & 1 & 1 & 0 \end{bmatrix}. \qquad \text{Eq. (12)}$$

FIG. 16A illustrates the bit allocation across the parameters communicated in the 54 bits of each MELP frame. FIG. 16B shows the transmission order for the 54 bits of each MELP frame for both voiced and unvoiced frame modes.

MELP Decoder

The received bit stream is unpacked from the communications channel 18 and assembled into the parametric codewords. Parameter decoding differs for the voiced and unvoiced frames. Pitch is decoded first as it contains the voiced/unvoiced mode information. If the pitch code is all zeros or has only 1 bit set, then the unvoiced mode is used. If two bits are set, a frame erasure is indicated. Otherwise, the pitch value is decoded and the voiced mode is used.

In the unvoiced mode, the (8,4) Hamming code is decoded to correct single bit errors and to detect double bit errors. If an uncorrectable error is detected, a frame erasure is indicated. Otherwise, the (7,4) Hamming codes are decoded, correcting single bit errors.

If an erasure is indicated in the current frame, by the Hamming code, by the pitch code, or directly signaled from the communication channel 18, then a frame repeat mechanism is implemented. All of the parameters for the current frame are replaced with the parameters from the previous frame. In addition, the first gain term is set equal to the second gain term so that no gain transitions are permitted.

If an erasure is not indicated, the remaining parameters are decoded. The LSFs are checked for ascending order and a minimum separation of 50 Hz. In the unvoiced mode, default parameter values are used for the pitch, jitter, band-pass voicing, and Fourier magnitudes. The pitch value is set to 50 samples, the jitter is set to 25%, the band-pass voicing strengths are set to 0, and the Fourier magnitudes arc set to 1.0. In the voiced mode, $V_{bpl}$ is set to 1; jitter is set to 25% if the aperiodic flag is set; otherwise, jitter is set to 0%. The band-pass voicing strength for the upper four bands is set to 1.0 if the corresponding bit is a 1; otherwise, the voicing strength is set to 0.

When the special all zero code for the first gain parameter $G_1$ is received, some errors in the second gain parameter, $G_2$, can be detected and corrected. This correction process provides improved performance in channel errors.

For quiet input signals, a small amount of gain attenuation is applied to both gain parameters using a power subtraction rule. This attenuation is a simplified, frequency invariant case of a smooth spectral subtraction noise suppression method. The background noise estimate is also used in the adaptive spectral enhancement calculation.

Gain, $G_1$, is then modified by subtracting a positive correction term, $G_{att}$ given in dB by:

$$G_{att}=-10\log_{10}(1-10^{0.1[G_n+3-G_1]}).\qquad\text{Eq. (13)}$$

All MELP speech synthesis parameters are interpolated pitch synchronously for each synthesized pitch period. The interpolated parameters are the gain in dB, LSFs, pitch, jitter, Fourier magnitudes, pulse and noise coefficients for mixed excitation, and spectral tilt coefficient for the adaptive spectral enhancement filter. Gain is linearly interpolated between the gain of the prior frame, $G_{2p}$, and the first gain of the current frame, $G_1$, if the starting point, $t_0$, $t_0=0, 1, \ldots, 179$, of the new pitch period is less than 90; otherwise, gain is interpolated between the $G_1$ and $G_2$. Normally, the other parameters are linearly interpolated between the past and current frame values. The interpolation factor, int, for these parameters is based on the starting point of the new pitch period:

$$int=t_0/180.\qquad\text{Eq. (14)}$$

There are two exceptions to the interpolation procedure. First, there is an onset with a high pitch frequency, pitch interpolation is disabled and the new pitch is immediately used. This condition is met when $G_1$ is more than 6 dB greater than $G_2$ and the current frame's pitch period is less than half the prior frame's pitch period. The second exception also involves a gain onset. If $G_2$ differs from $G_{2p}$ by more than 6 dB, then the LSFs, spectral tilt, and pitch are interpolated using the interpolated gain trajectory as a basis, since the gain is transmitted twice per frame and has a more accurate interpolation path. In this case, the interpolation factor is given by:

$$int=\frac{G_{int}-G_{2p}}{G_2-G_{2p}},\qquad\text{Eq. (15)}$$

where $G_{int}$ is the interpolated gain. This interpolation factor is then clamped between 0 and 1.

New Mixed Excitation Algorithm

Figure 9:
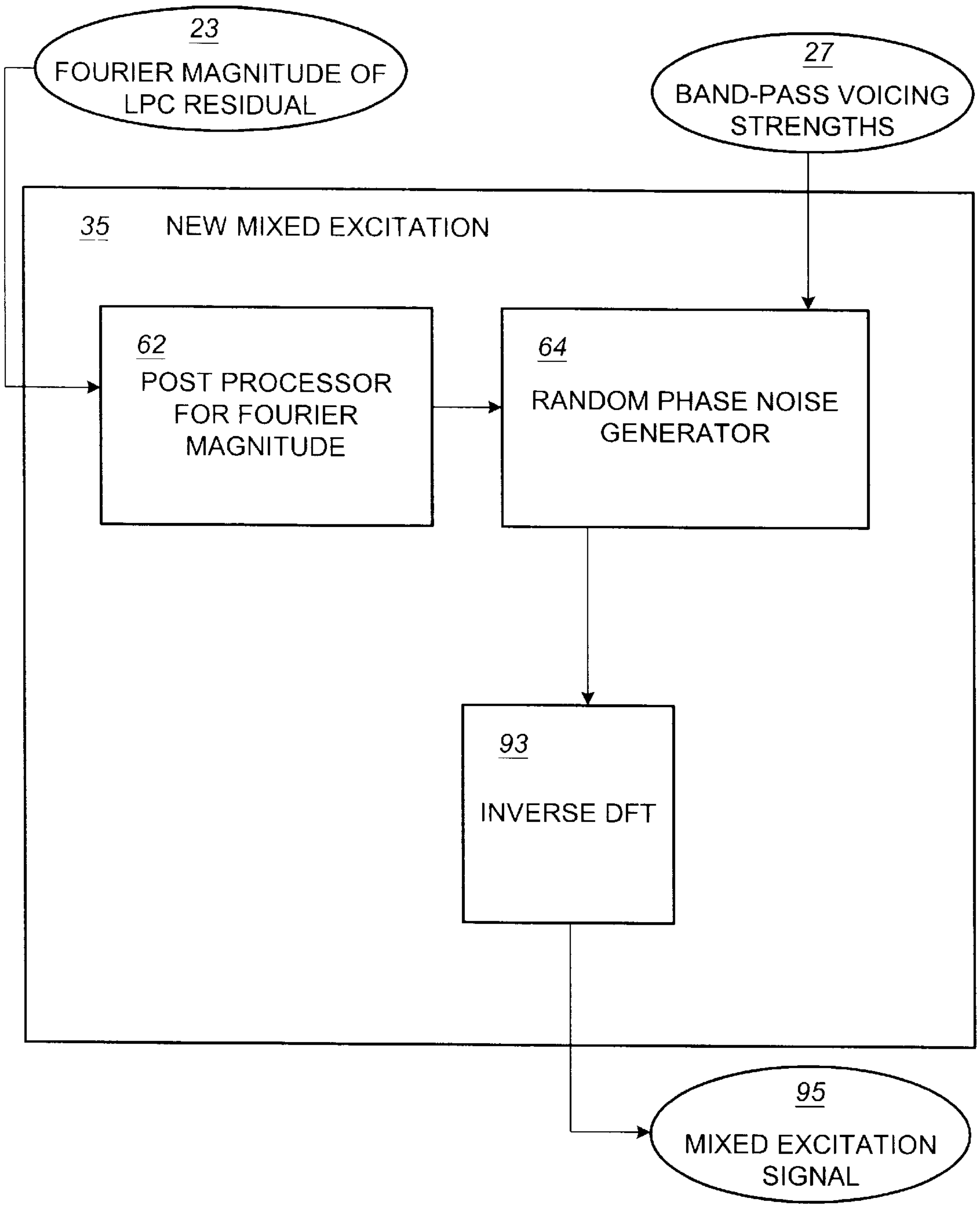
FIG. 9 illustrates a block diagram of the new mixed excitation method of the present invention as shown in FIG. 2C.

Although the mixed excitation method in the existing MELP coder minimizes the band-pass filtering operations, it still requires two $32^{nd}$ order FIR filtering operations for a pulse train and noise. The present invention removes these filters to reduce the computational complexity of the existing MELP. FIG. 9 shows a new mixed excitation algorithm in the present invention. The existing MELP uses the Fourier magnitudes to generate a pulse train. The pulse train is mixed with random noise in time domain by band-pass filtering. In the present invention, noise is mixed with a pulse train in the frequency domain by adding a random phase to the Fourier magnitudes. Block 64 shows the random phase generator. The random phase is added to only the Fourier magnitudes in unvoiced frequency bands. The mixed excitation signal in the present method is given by:

$$e_m(n)=\frac{1}{2\pi}\int_{-\pi}^{\pi}E_M(e^{j\omega})e^{j\omega n}d\omega,$$

if, $\omega=0$, $\omega=\pi$, or in the voiced band, $$E_M(e^{j\omega})=E_0(e^{j\omega})$$

otherwise, $$E_M(e^{j\omega})=E_0(e^{j\omega})e^{j\omega\phi},$$

$$\phi=U[-\alpha\pi,\alpha\pi]\qquad\text{Eq. (16)}$$

where $\alpha$ is an interpolation coefficient between 0 and 1. Since the existing MELP coder generates a pulse pitch-synchronously, the band-pass voicing decision needs to be linearly interpolated between 0 (voiced) and 1 (unvoiced).

The adaptive spectral enhancement filter is then applied to the mixed excitation signal. This filter is a $10^{th}$ order pole/zero filter with additional first order tilt compensation. The coefficients are generated by bandwidth expansion of the LPC filter transfer function A(z), corresponding to the interpolated LSFs. The transfer function of the enhancement filter, $H_{ase}(z)$, is given by:

$$H_{ase}(z)=\frac{A(\alpha z^{-1})}{A(\beta z^{-1})}\times(1+\mu z^{-1}),\qquad\text{Eq. (17)}$$

where, $$\alpha=0.5p$$

$$\beta=0.8p'\qquad\text{Eq. (18)}$$

and tilt coefficient $\mu$ is first calculated as max(0.5 $k_1$, 0), then interpolated and multiplied by p, the signal probability. The first reflection coefficient, $k_1$, is calculated from the decoded LSFs. By the MELP predictor coefficient sign convention, $k_1$, is usually negative for the voiced spectra. The signal probability p is estimated by comparing the current interpolated gain, $G_{int}$, to the background noise estimate $G_n$ using the formula:

$$p=\frac{G_{int}-G_n-12}{18}\qquad\text{Eq. (19)}$$

This signal probability is clamped between 0 and 1.

Linear prediction synthesis is performed by applying the coefficients corresponding to the interpolated LSFs directly to the form filter.

Since excitation of the synthesized voice signal is generated at an arbitrary level, a speech gain adjustment must be performed on the synthesized speech. The correct scaling factor, $S_{gain}$, is computed for each synthesized pitch period of length T by dividing the desired RMS value ($G_{int}$ must be converted from dB) by the RMS value of the unsealed synthetic speech signal $s_n$:

$$S_{gain}=\frac{10^{\frac{G_{int}}{20}}}{\sqrt{\frac{1}{T}\sum_{n=1}^{T}s_n^2}}.\qquad\text{Eq. (20)}$$

To prevent discontinuities in the synthesized speech, this scale factor is linearly interpolated between the previous and current values for the first ten samples of the pitch period.

The pulse dispersion filter is a $65^{th}$ order FIR filter derived from a spectrally flattened triangular pulse. The coefficients used in the filter are provided in the Specification for the Analog to Digital Conversion of Voice by 2,400 Bit/Second Mixed Excitation Linear Prediction herein enclosed for reference.

Post Processor for the Fourier Magnitude Model

Figure 2C:
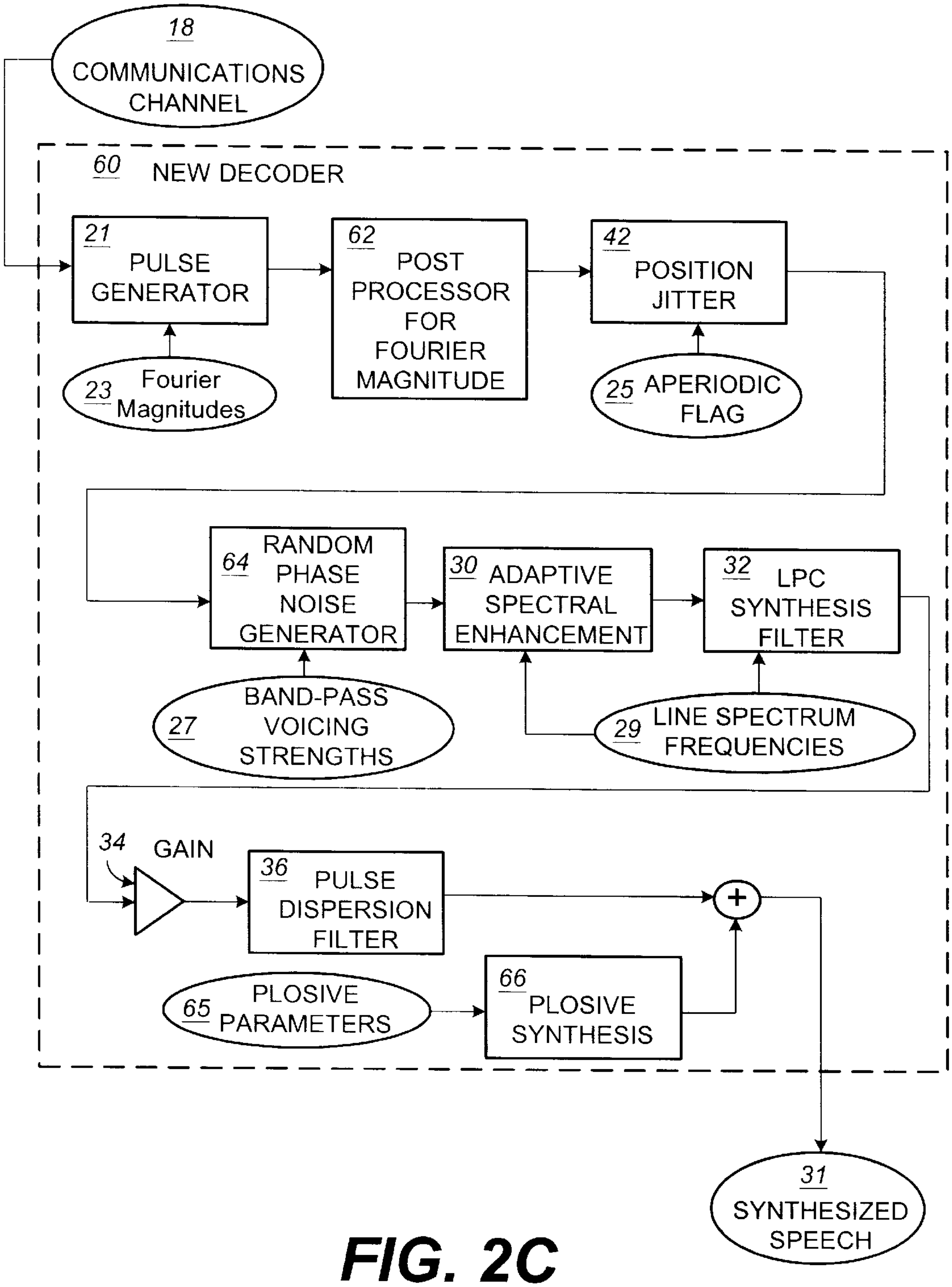
FIG. 2C is a block diagram illustrating the new decoder of FIG. 2A.
Figure 8:
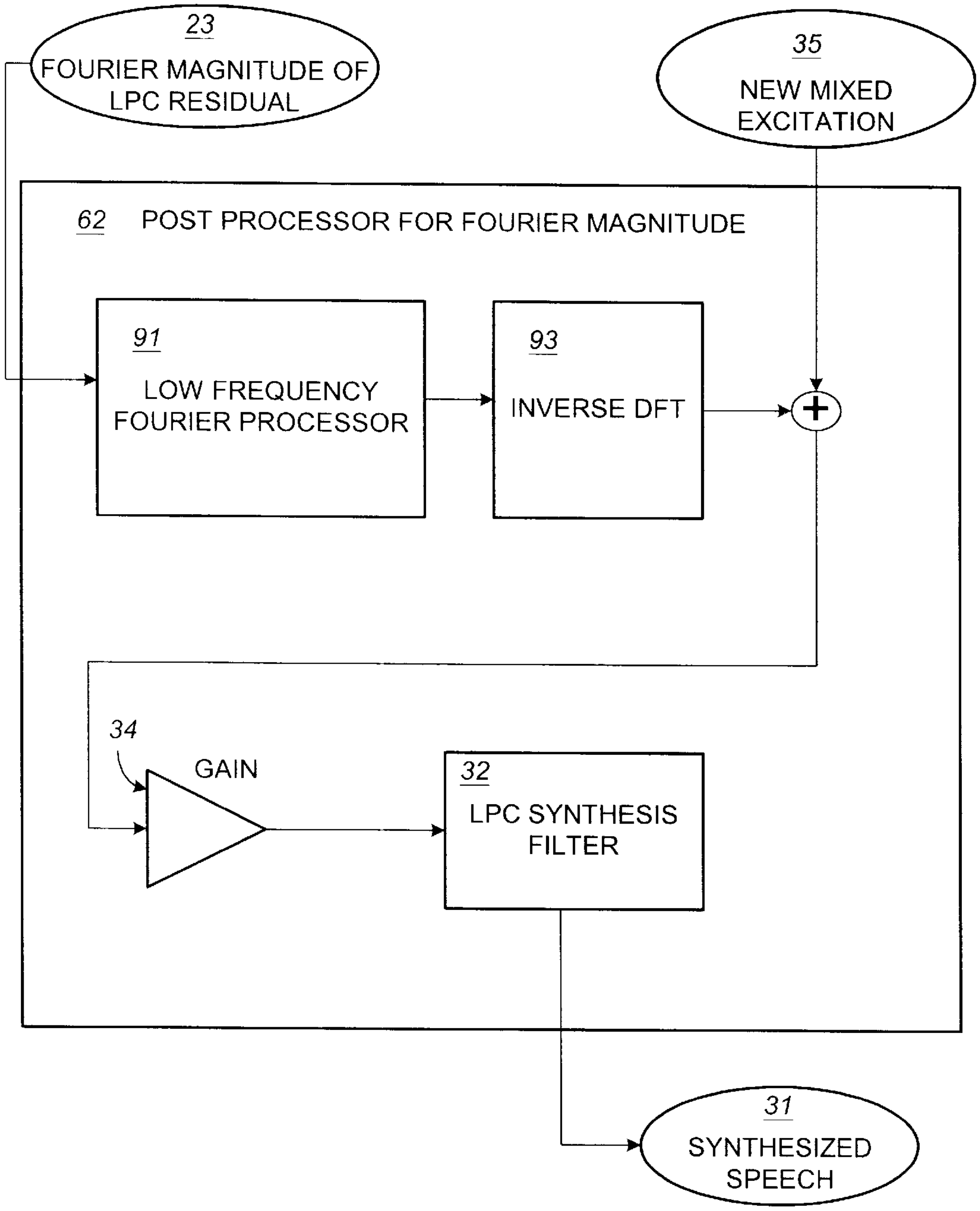
FIG. 8 illustrates a block diagram of the post processor for the Fourier magnitude of the present invention as shown in FIG. 2C.

In the present invention, a post processor for the Fourier magnitude model 62 is added to the MELP decoder as shown in FIG. 2A. In the prior art, it was observed that the first few harmonic magnitudes of the coded speech for some low-pitch male speakers were suppressed by the preprocessing high-pass filter 11 in FIG. 2B and the adaptive spectral enhancement filter (ASEF) 30 in FIG. 2C. It was found that this effect led to a high-pass filtered quality for low-pitch male speakers. To provide more natural speech quality for such speakers, the present invention adaptively emphasizes the harmonic magnitudes in low frequencies by removing the effect of the two filters. The emphasized harmonic magnitude is given by:

$$|\tilde{S}(e^{j\omega_i})| = |S(e^{j\omega_i})|\frac{G}{|H(e^{j\omega_i})|}, \qquad \text{Eq. (21)}$$

where $\omega_1$ is the $i^{th}$ harmonic frequency, G is the average Fourier spectrum energy, and $|S(e^{j\omega})|$ is the non-emphasized Fourier magnitude of the $i^{th}$ harmonic. As shown in FIG. 8, the present invention uses the MELP Fourier magnitude parameters, which are the Fourier magnitudes of the LPC residual signal 23, for the harmonic magnitude emphasis rather than using the harmonic magnitude of the synthesized speech $S(e^{j\omega})$. From Parseval's theorem, the average Fourier spectrum magnitude G is given by:

$$G = \sum_{n=0}^{N-1} |h(n)^2|, \qquad \text{Eq. (22)}$$

where h(n) is the impulse response of the filter $H(e^{j\omega})$, and N is the length of impulse response. The magnitude response of the filter $|H(e^{j\omega})$, is given by:

$$|H(e^{j\omega})|=|H_1(e^{j\omega})||H_2(e^{j\omega})|, \qquad \text{Eq. (23)}$$

where $H_1(e^{j\omega})$ and $H_2(e^{j\omega})$ are the magnitude responses of the ASEF 30 and preprocessing high-pass filter 11 respectively. To avoid losing the advantage of the ASEF 30 in the prior art, the harmonic magnitude emphasis is applied to only the harmonics that are 200 Hz less than the first formant frequency of the frame. The first formant frequency $F_1$ is roughly estimated using quantized line spectrum frequencies (LSFs) as follows:

$$f_1 = \frac{\hat{f}_1 + \hat{f}_2}{2},$$

otherwise, $$F_1 = \frac{\hat{f}_2 + \hat{f}_3}{2}, \qquad \text{Eq. (23)}$$

where $\hat{f}_i$ is the $i^{th}$ quantized LSF. From the experimental result, the emphasized harmonic magnitude $|\tilde{S}(e^{j\omega_i})|$ is further emphasized by 2 dB in the present invention.

Plosive Synthesis

Figure 7:
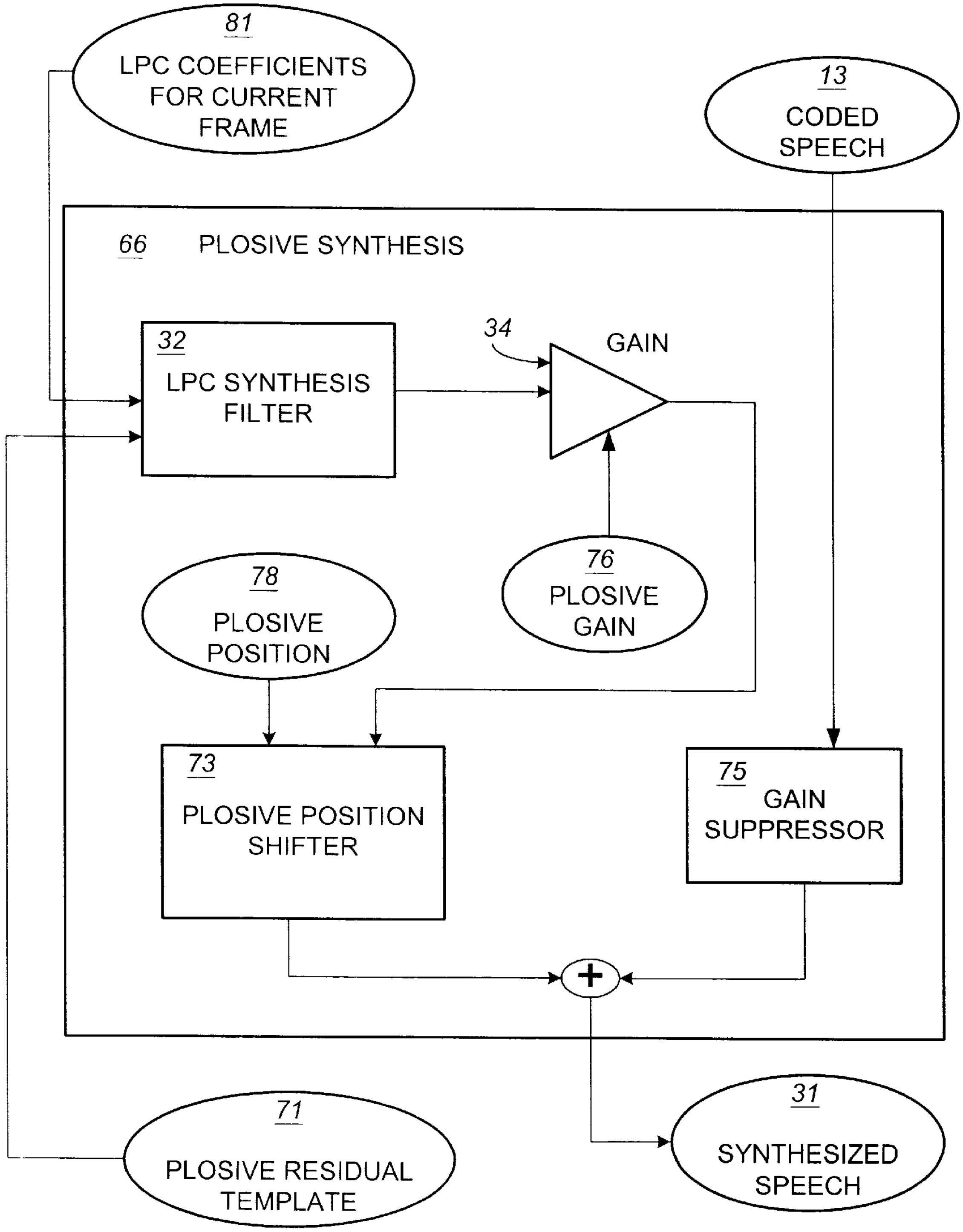
FIG. 7 illustrates a block diagram of the plosive synthesizer of the present invention as shown in FIG. 5.

FIG. 7 shows the block diagram of the plosive synthesis 66. As shown in FIG. 7, all plosive signals are produced by scaling and LPC synthesis/filtering 32 the plosive residual template 71, which is pre-stored in the synthesizer This plosive residual template 71 was chosen arbitrarily and filtered with the $14^{th}$ order LPC inverse filter. The LPC coefficients for the frame that contains the plosive 81 are also used for the plosive signal synthesis. The gain of synthesized plosive signal is adjusted by applying plosive gain 76 to the MELP gain 34. In the present invention, the length of synthesized plosive signal is a half of the frame length, and the synthesized plosive is added back to either the first half or the second half of the coded speech frame according to the plosive position as shown in block 73. Before the plosive is added back to the coded speech, the gain of the coded speech is adjusted in gain suppressor 75 such that the gain of the half frame to which the plosive is added back is suppressed. It is realized by simply replacing the gain of the half frame to which the plosive is added back with that of the previous half frame:

$g_i(0)=g_{i-1}(1)$, if the plosive position is the first half of the frame, otherwise, $g_i(1)=g_i(0)$, if the plosive position is the second half of the frame, where $g_i(j)$ is the $j^{th}$ gain (j=0,1) in the $i^{th}$ frame. Since plosive detection, modeling and synthesis are performed independently from the MELP coder as shown in FIG. 5, this embodiment can be applied to other low bit-rate speech coders.

Bit Allocation

Figure 10:
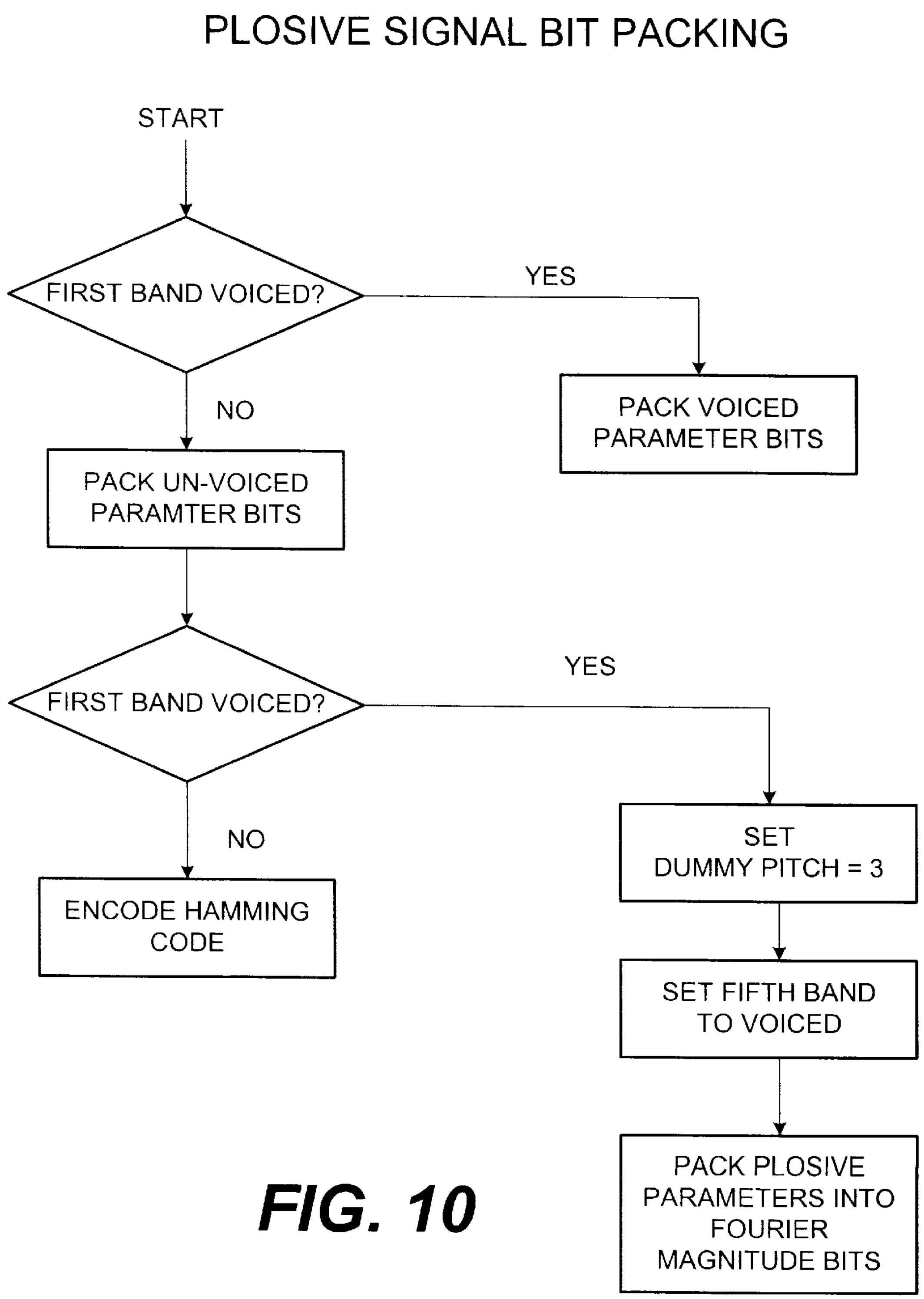
FIG. 10 illustrates the flow diagram of bit packing for the plosive signal parameters within voiced and unvoiced frames.
Figure 11:
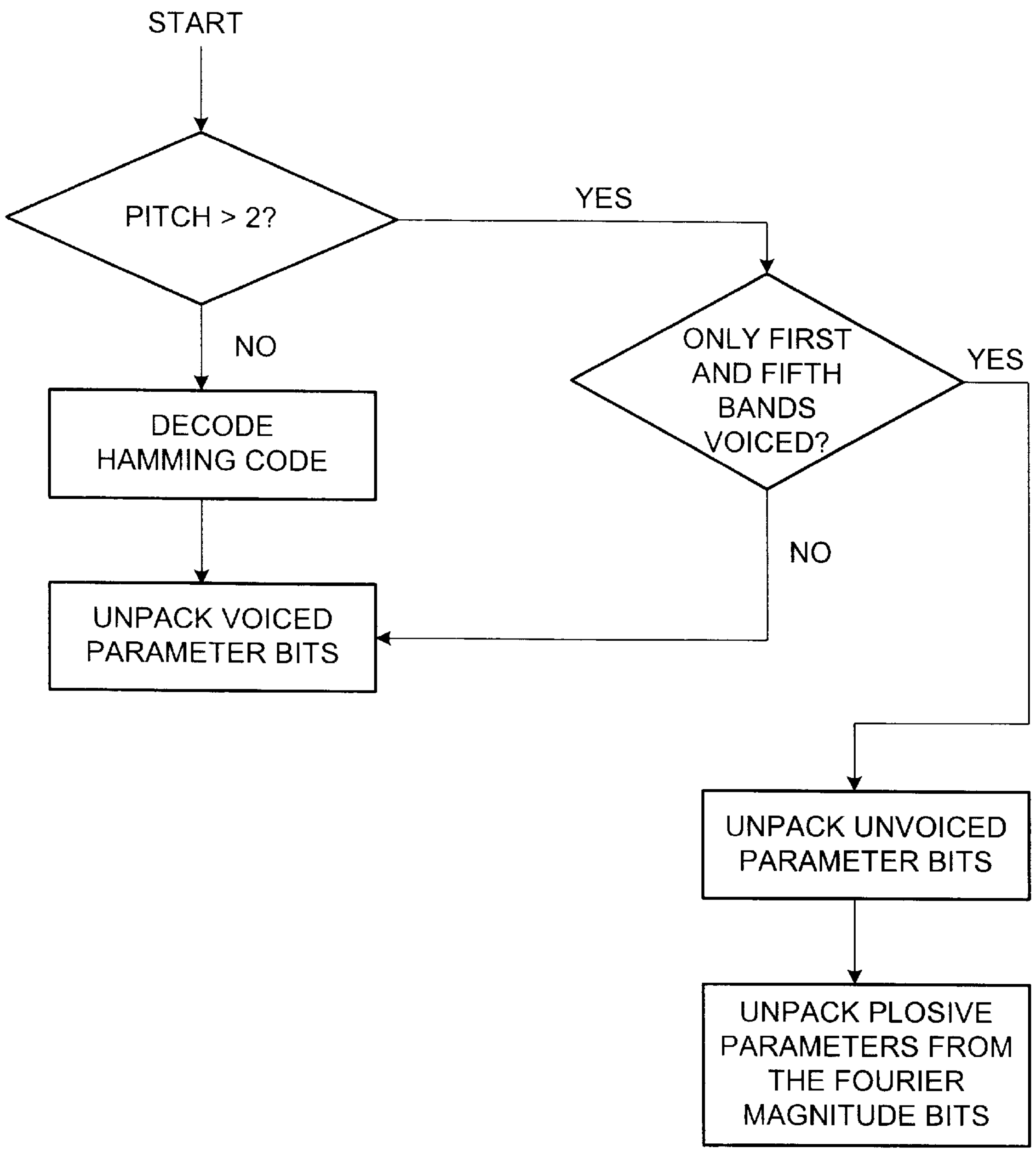
FIG. 11 illustrates the flow diagram of the bit unpacking for the plosive signal parameters for voiced and unvoiced frames.

Another advantage of the present invention is bit-stream compatibility with the existing MELP coder. The present invention consists of four embodiments including a robust pitch detector, a plosive analysis/synthesis system, a post processor for the Fourier magnitude model and a new mixed excitation algorithm. As shown in FIG. 14, only the plosive analysis/synthesis system requires additional bits for transmission. In the present invention, the additional bits for the plosive can be packed into the bit-stream of the existing MELP. There are two different modes for the bit allocation of the existing MELP: one voiced, the other unvoiced. The mode is selected as voiced if the first band is voiced and as unvoiced if the first band is unvoiced. For unvoiced mode, the existing MELP coder sets only the first and fifth band to voiced and the index for a pitch lag is set less than three so as to indicate that the frame is unvoiced. In the decoder, if the index for the pitch lag is less than three, the frame is regarded as unvoiced. Otherwise, the frame is regarded as voiced. In the present invention, a frame that contains a plosive is assumed to be a unvoiced frame. FIG. 10 shows the bit packing flow diagram for the plosive signal. To identify the plosive frame in the decoder of the present invention, the first and the fifth frame is set to voiced but the pitch is set to three as a dummy. Then, a plosive gain and position is packed into the bits for the Fourier magnitude, which is used for the voiced frame in the existing MELP. FIG. 11 shows the bit unpacking flow diagram for the plosive signal. The decoder of the existing MELP regards the frame as unvoiced if the pitch index is less than three. If the pitch index is equal to or greater than three, the combination that only the first and the fifth bands are unvoiced will never occur in the existing MELP. In the decoder of the present invention, the frame is regarded as the plosive frame if this combination occurs. Then, the plosive parameters such as a gain and position are extracted from the bits for the Fourier magnitude. Since the bit-stream specification is maintained in the present invention, the present system can interchange the encoder/decoder with the existing MELP.

While preferred embodiments of the invention have been disclosed in detail in the foregoing description and drawings, it will be understood by those skilled in the art that variations and modifications thereof can be made without departing from the spirit and scope of the invention as set forth in the following claims.

Therefore, having thus described the invention, at least the following is claimed:

1. A method of enhancing the speech quality of a speech coder encoded data transmission, comprising:

digitally sampling speech to create a speech waveform over a plurality of frames;

identifying frames that contain a plosive signal distinguished from other transitory signals;

analyzing the plosive signal to create plosive signal parameters;

applying the plosive signal parameters to a linear prediction residual plosive signal to synthesize the plosive signal for frames that contain a plosive signal; and adding the synthesized plosive signal to the synthesized speech for the frame that contains the plosive.

2. The method of claim 1, wherein the step of identifying frames that contain a plosive signal comprises detecting peakiness in a linear prediction residual signal.

3. The method of claim 1, wherein the step of applying further comprises:

applying the plosive signal parameters to a previously-stored linear prediction residual plosive signal and applying a linear prediction synthesis filter.

4. The method of claim 1, wherein the step of analyzing comprises identifying a subdivision of the frame that contains the plosive and calculating the amplitude of the plosive.

5. The method of claim 3, wherein applying the plosive signal parameters comprises scaling a previously-stored plosive signal by the plosive amplitude.

6. The method of claim 5, wherein the length of a previously-stored linear prediction residual plosive signal is equal to the length of a subdivision of the frame containing the plosive.

7. The method of claim 2, wherein detecting peakiness in the linear prediction residual signal comprises computing the ratio of the L1 and L2 norm of the linear prediction residual signal with a sliding sample window.

8. The method of claim 4, wherein the step of adding the synthesized plosive signal comprises adding the synthesized plosive signal to the identified subdivision of the frame.

9. A speech coder, comprising:

means for digitally sampling speech to create a speech waveform over a plurality of frames;

means for identifying frames that contain a plosive signal distinguished from other transitory signals;

means for analyzing the plosive signal to create plosive signal parameters;

means for applying the plosive signal parameters to a linear prediction residual signal to synthesize the plosive signal for frames that contain the plosive; and means for adding the plosive signal to the synthesized speech for frames that contain the plosive.

10. The coder of claim 9, wherein the means for identifying frames that contain a plosive signal detects peakiness in a linear prediction residual signal.

11. The coder of claim 9, wherein the means for synthesizing the plosive signal applies the plosive signal parameters to a previously-stored linear prediction residual plosive signal and applies a linear prediction synthesis filter.

12. The coder of claim 9, wherein the means for analyzing the plosive signal to create plosive parameters, identifies a subdivision of the frame that contains the plosive and calculates the amplitude of the plosive.

13. The coder of claim 12, wherein the length of a previously-stored linear prediction residual plosive signal is substantially equivalent to the length of the subdivision.

14. The coder of claim 11, wherein the means for applying the plosive signal parameters further comprises:

scaling a previously-stored signal by the plosive amplitude.

15. The coder of claim 10, wherein the means for identifying further comprises:

detecting peakiness in the linear prediction residual signal.

16. The coder of claim 15, wherein detecting peakiness comprises computing the ratio of the L1 and L2 norm of the linear prediction residual signal with a sliding sample window.

17. The coder of claim 12, wherein the means for adding the plosive signal to the synthesized speech comprises adding the synthesized plosive signal to the subdivision.

* * * * *

UNITED STATES PATENT AND TRADEMARK OFFICE

CERTIFICATE OF CORRECTION

PATENT NO. : 6,453,287 B1 
DATED : September 17, 2002
INVENTOR(S) : Unno et al.

It is certified that error appears in the above-identified patent and that said Letters Patent is hereby corrected as shown below:

Column 1,
Line 45, after the word "gain"; insert -- . The parameters --
Line 59, after the word "coder"; insert -- that --

Column 4,
Line 27, after the word "frames"; delete "." and substitute therefor -- ; --

Column 5,
Line 39, after the word "Detection", insert a carriage return.

Column 7,
Line 34, after the first occurrence of a minus sign not in a subscript; insert -- | --

Column 8,
Line 8, after the word "and"; delete "$a_1$" and substitute therefor -- $a_i$ --
Line 36, after the word "When"; delete "$V_{bp,}$>0.6"; and substitute therefor -- $V_{bp1}$>0.6 --.

Column 10,
Line 60, after the word "magnitudes"; delete "arc" and substitute therefor -- are --

Column 13,
Line 42, after the word "filter", delete "$|H(e^{j\omega})|$,"; and substitute therefor -- $|H(e^{j\omega})$, --

Signed and Sealed this

Twenty-second Day of April, 2003

JAMES E. ROGAN
*Director of the United States Patent and Trademark Office*